United States Patent
Ishizuka et al.

(10) Patent No.: US 12,137,039 B2
(45) Date of Patent: Nov. 5, 2024

(54) MANAGEMENT APPARATUS

(71) Applicant: NTT DOCOMO, INC., Chiyoda-ku (JP)

(72) Inventors: Hiroki Ishizuka, Chiyoda-ku (JP); Masashi Anzawa, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 18/041,513

(22) PCT Filed: Sep. 10, 2021

(86) PCT No.: PCT/JP2021/033390
§ 371 (c)(1),
(2) Date: Feb. 13, 2023

(87) PCT Pub. No.: WO2022/065087
PCT Pub. Date: Mar. 31, 2022

(65) Prior Publication Data
US 2023/0308364 A1    Sep. 28, 2023

(30) Foreign Application Priority Data

Sep. 24, 2020   (JP) ................................ 2020-159646

(51) Int. Cl.
*G06F 15/16*   (2006.01)
*H04L 12/14*   (2006.01)
*H04L 41/5003*   (2022.01)

(52) U.S. Cl.
CPC .......... *H04L 41/5003* (2013.01); *H04L 12/14* (2013.01)

(58) Field of Classification Search
None
See application file for complete search history.

(56) References Cited

U.S. PATENT DOCUMENTS 8,130,655 B2 *   3/2012   Foottit .................... H04L 47/12
                                                                   370/230.1
9,210,102 B1 *   12/2015   Wise ..................... H04L 47/826
(Continued)

FOREIGN PATENT DOCUMENTS

JP         2014-33446 A    2/2014

OTHER PUBLICATIONS

International Search Report issued Nov. 30, 2021 in PCT/JP2021/033390 filed on Sep. 10, 2021, 4 pages.

*Primary Examiner* — Phuoc H Nguyen
(74) *Attorney, Agent, or Firm* — Oblon, McClelland, Maier & Neustadt, L.L.P.

(57) ABSTRACT

A management apparatus includes: a quality manager configured to: acquire (i) a control request for requesting control of quality of communication, the communication being executed when an application program installed in the terminal apparatus is executed, and (ii) terminal information related to the terminal apparatus; and based on the control request and the terminal information, execute a control process causing at least one of the one or more networks to execute the control of quality; and a charge manager configured to: acquire, from each of the plurality of networks, fee information showing a usage fee of the control of quality; and charge a fee based on the fee information to an application provider providing the application program to the terminal apparatus.

11 Claims, 12 Drawing Sheets

(56) References Cited

U.S. PATENT DOCUMENTS

| | | | |
|---|---|---|---|
| 10,432,798 B1* | 10/2019 | Wong | H04M 15/8016 |
| 2016/0212654 A1* | 7/2016 | Itoh | H04W 88/12 |
| 2018/0302907 A1* | 10/2018 | Niina | H04W 72/56 |
| 2020/0015046 A1* | 1/2020 | Wong | H04W 24/10 |

* cited by examiner

FIG. 2

| Carrier ID | Carrier individual information (CAINF) ||
|---|---|---|
| | API information | Aaccess-destination information |
| Carrier A | API information A | Address A |
| Carrier B | API information B | Address B |
| ⋮ | ⋮ | ⋮ |

TBL

FIG. 3

| API information | • a request to start QoS control<br>• a request to terminate QoS control<br>• confirmation of the state of QoS control<br>• confirmation of whether QoS control can be used<br>• acquisition of SIM information<br>• request mode types<br>• requested communication quality<br>(throughput, latency time, jitter, frame rates, packet loss rates, etc.)<br>• SIM information<br>• user apparatus information<br>• area information<br>(location information, map information, base-station information, weather information, shielding information, presence/absence of a failure notification)<br>• unique functions of the carrier |
|---|---|

FIG. 4

| Terminal information (TEINF) | SIM information | · IMSI<br>· MSISDN<br>· ICCID<br>· contract information<br>· contract state |
|---|---|---|
| | User apparatus information | · IP address of terminal apparatus<br>· model name of terminal apparatus<br>· application information<br>  (application program name, etc.)<br>· corresponding server information<br>· corresponding user apparatus information<br>· signature information<br>· package information<br>· OS information<br>· memory information<br>· CPU information<br>· usage rate of CPU<br>· usage rate of memory<br>· identification information about user<br>  (fingerprints, iris, face, password, etc.) |

FIG. 5

| Network information | · 5-tuple information<br>(a transmission-source IP address, a target IP address, a transmission-source port number, a target port number, and a protocol ID)<br>· APN<br>· communication system information<br>(3G, 4G, 5G, wireless LAN, tethering, wired, etc.)<br>· communication quality<br>(throughput, latency time, jitter, frame rates, packet loss rates, etc.)<br>· working rate<br>· availability<br>· the number of concurrent connections |
|---|---|

FIG. 6

| Application ID | Network ID |
|---|---|
| APα | NWa |
|  | NWb |
| APβ | NWb |
| APγ | NWa |
|  | NWc |
|  | NWd |
|  | NWe |
| ⋮ | ⋮ |

FIG. 7

| Application ID | Terminal apparatus ID | Usage fees |
|---|---|---|
| APα | TE001 | 2345 |
|  | TE002 | 0 |
|  | TE003 | 1000 |
|  | ⋮ | ⋮ |
| APβ | TE001 | 0 |
|  | TE002 | 4450 |
|  | TE003 | 2000 |
|  | ⋮ | ⋮ |
| ⋮ | ⋮ | ⋮ |

FIG. 8

| Terminal apparatus ID | Application ID | Usage fees |
|---|---|---|
| TE001 | APα | 2345 |
|  | APβ | 0 |
|  | ⋮ | ⋮ |
| TE002 | APα | 0 |
|  | APβ | 4450 |
|  | ⋮ | ⋮ |
| TE003 | APα | 1000 |
|  | APβ | 2000 |
|  | ⋮ | ⋮ |
| ⋮ | ⋮ | ⋮ |

(*Network 300a is not registered in the registration list LST of the application program PRapβ)

MANAGEMENT APPARATUS

TECHNICAL FIELD

The present invention relates to management apparatuses.

BACKGROUND ART

Known is a technique to ensure quality of Quality of Service (QoS) control in networks. For example, for a system in which terminal apparatuses such as smartphones are connected to a network, a method of executing the QoS control depending on QoS levels requested from the terminal apparatuses has been proposed (for example, Patent Document 1).

RELATED ART DOCUMENT

Patent Document

Patent Document 1: Japanese Patent Application Laid-Open Publication No. 2014-33446

SUMMARY OF THE INVENTION

Problem to be Solved by the Invention

In the networks managed by carriers, calculation methods for usage fees of the QoS control (fee systems, charge mechanisms, etc.) different depending on the carriers which provide QoS. Procedures for QoS usage, such as applications for QoS usage, and payments for usage fees for the QoS control, are carried out for each carrier. An application program which requests execution of QoS control to all of the networks may be installed in a terminal apparatus. In such a case, the application provider which provide the application program carries out the procedures for the QoS usage for the plurality of carriers. However, when the application provider carries out the procedures for the QoS usage for the plurality of carriers, the procedures for QoS usage become complex.

Means for Solving the Problem

In order to solve the above problem, a management apparatus according to a preferred aspect of the present invention is a management apparatus communicable with a terminal apparatus connected to one or more networks of a plurality of networks managed by one or more carriers, the management apparatus including: a quality manager configured to: acquire (i) a control request for requesting control of quality of communication, the communication being executed when an application program installed in the terminal apparatus is executed, and (ii) terminal information related to the terminal apparatus; and based on the control request and the terminal information, execute a control process causing at least one of the one or more networks to execute the control of quality; and a charge manager configured to: acquire, from each of the plurality of networks, fee information showing a usage fee of the control of quality; and charge a fee based on the fee information to an application provider providing the application program to the terminal apparatus.

Effect of the Invention

According to the present invention, even in a case in which an application program which can request any of a plurality of networks to execute QoS control is installed in a terminal apparatus, the procedure for QoS usage can be prevented from becoming complex.

BRIEF DESCRIPTION OF THE DRAWINGS

FIG. 2 is an explanatory diagram illustrating an example of a management table illustrated in FIG. 1.

FIG. 3 is an explanatory diagram illustrating an example of API information.

FIG. 4 is an explanatory diagram illustrating an example of terminal information.

FIG. 5 is an explanatory diagram illustrating an example of network information.

FIG. 6 is an explanatory diagram illustrating an example of a registration list.

FIG. 7 is an explanatory diagram illustrating an example of fee information.

FIG. 8 is an explanatory diagram illustrating another example of the fee information.

MODES FOR CARRYING OUT THE INVENTION

1. Embodiment

Figure 1:
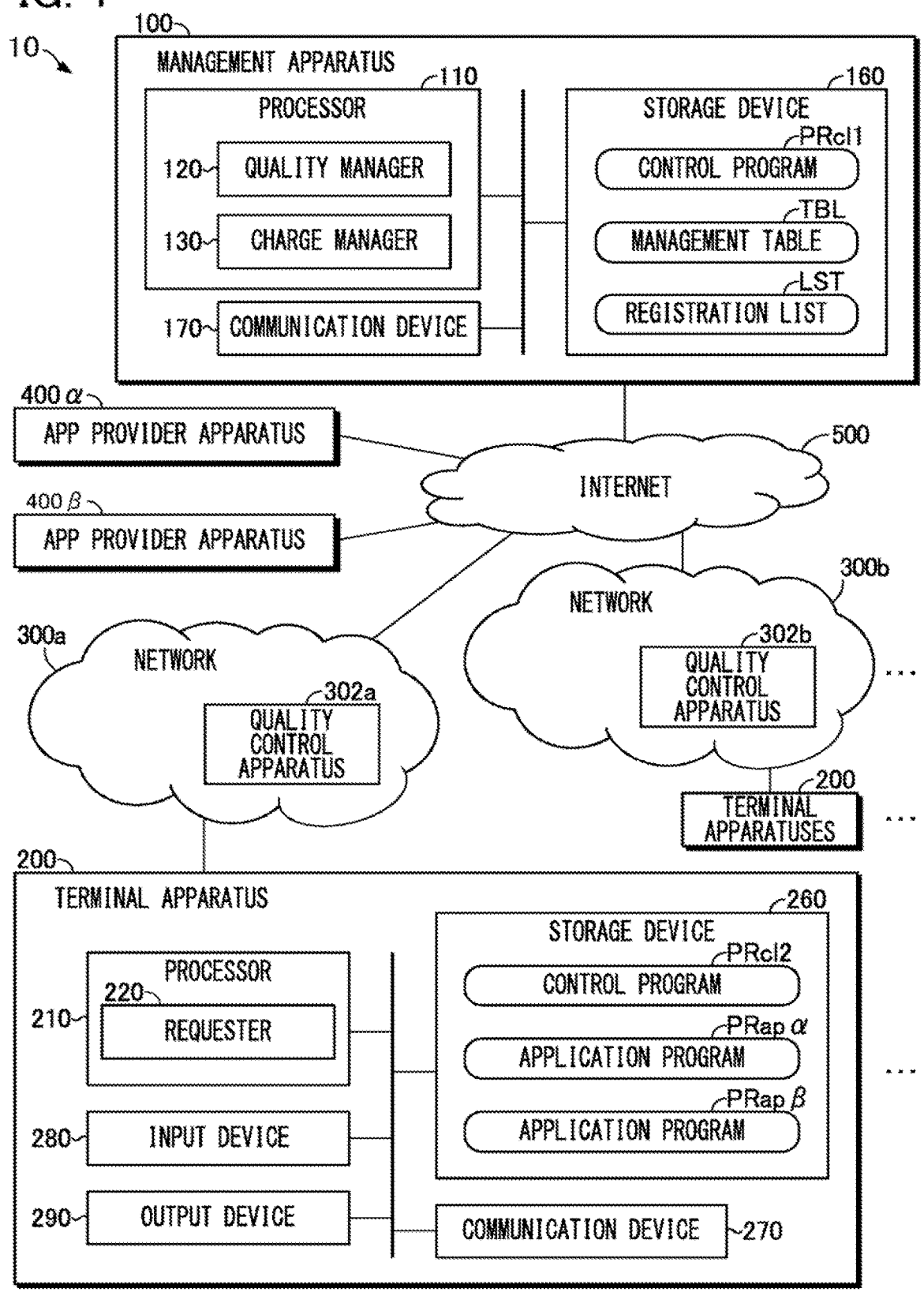
FIG. 1 is a block diagram illustrating an overall configuration of a network system including a management apparatus according to an embodiment.

FIG. 1 is a block diagram illustrating an overall configuration of a network system 10 including a management apparatus 100 according to an embodiment. As exemplified in FIG. 1, the network system 10 has networks 300 mutually connected via the Internet 500, the management apparatus 100 connected to the networks 300 via the Internet 500, and terminal apparatuses 200 connected to the network 300. Furthermore, the network system 10 has app provider apparatuses 400 of application providers, which provide application programs PRap installed in the terminal apparatus 200.

The application provider may provide the application program PRap to the terminal apparatus 200, for example, by transmitting the application program PRap from a website, which is managed by the application provider, to the terminal apparatus 200. The application provider may use a website which is managed by a third party as the website for transmitting the application program PRap to the terminal apparatus 200.

The terminal apparatus 200 is connected to one or more networks 300 from among the networks 300. The terminal apparatus 200 may be concurrently connected to two or more networks 300 from among the networks 300. The management apparatus 100 may be connected to the networks 300 without the intermediation of the Internet 500. The term "apparatus" in the present description may be replaced with another term such as a circuit, a device, or a unit.

Each of the networks 300 includes electronic communication lines such as a mobile communication network managed by each of the carriers, which provide communication services, and includes one or both of a wired network and a wireless network. The networks 300 may include two or more networks 300 which are managed by the same carrier. The management of the network 300 includes operation of the network 300. However, when the carrier is a virtual mobile carrier, the management of the network 300 includes a case in which the wireless stations such as base stations in the network 300 is not included, and a case in which wired stations are not included. Each of the networks 300 has a quality control apparatus 302. In FIG. 1, in order to facilitate understanding of the drawing, illustration of nodes (e.g., base stations) from among the nodes (devices) included in the networks 300 is omitted except for the quality control apparatuses 302.

The connections between the networks 300, the connections between the networks 300 and the terminal apparatuses 200, and the connections between the networks 300 and the management apparatus 100, for example, are only required to mutually communicably connect the elements, and they may be only wired connections, only wireless connections, or may be connections using both wired connections and wireless connections.

In FIG. 1, in order to distinguish the networks 300 from each other, the end of the reference sign of the network 300 is denoted by a lowercase letter (a or b). The ends of the reference signs of the quality control apparatus 302, etc. included in the network 300 are also denoted by the same lowercase letter (a or b), which is the same as the corresponding network 300.

For example, the network 300a is managed by a carrier which is different from the carrier managing the network 300b. The quality control apparatus 302a is included in the network 300a and controls the quality of communication services related to the network 300a. For example, the quality control apparatus 302b is included in the network 300b and controls the quality of communication services related to the network 300b.

In FIG. 1, in order to distinguish the app provider apparatuses 400 from each other, the end of the reference sign of the app provider apparatus 400 is denoted by a Greek letter (α or β). The end of the reference sign of the application program PRap, which is provided by the application provider managing the app provider apparatus 400, is also denoted by the same Greek letter (α or β) as that of the corresponding app provider apparatus 400.

For example, the app provider apparatus 400α is managed by an application provider which is different from the application provider managing the app provider apparatus 400β. For example, the application program PRapα is the application program PRap which is provided by the application provider managing the app provider apparatus 400α. For example, the application program PRapβ is the application program PRap which is provided by the application provider managing the app provider apparatus 400β.

The quality control of the communication service related to the network 300 may be executed for each terminal apparatus 200, it may be executed for each application program PRap, it may be executed for each communication line, or it may be executed for each Subscriber Identity Module (SIM). The SIM is a module in which the identification information for identifying a subscriber of the communication service is recorded. In this embodiment, a case is given in which the quality control of the communication service related to the network 300 is executable for each application program PRap. In other words, in this embodiment, a case is given in which the quality control for the communication of the application program PRap installed in the terminal apparatus 200 is executable by the network 300 (more specifically, the quality control apparatus 302). The communication of the application program PRap is the communication which is executed when the application program PRap is executed. The quality of the communication refers to "quality of the communication". Hereinafter, the quality control will be referred to as Quality of Service (QoS) control. The quality control of the communication is referred to as the QoS control for the communication. The QoS control includes bandwidth control, low-latency control, and priority control.

In the bandwidth control, for example, the bandwidth of the communication of the network 300 is controlled. The bandwidth control may be bandwidth guarantee which sets a lower limit value of the bandwidth or may be bandwidth limiting which sets an upper limit value of the bandwidth. Similarly, the low-latency control may be latency guarantee which sets an upper limit value of latency or it may be latency limit which sets a lower limit value of latency. In the priority control, for example, the transfer of packets (data which is in transfer units when communication is carried out) related to particular communication is prioritized. For example, priority degrees are given to the packets flowing in the network 300, and the packets with higher priority degrees than the other packets are processed before the other packets.

In this embodiment, the QoS control is executed, for example, when the terminal apparatus 200 requests the QoS control to the quality control apparatus 302 via the management apparatus 100.

The management apparatus 100 is, for example, an information processor such as a server and is communicable with the terminal apparatuses 200 connected to the networks 300. In this embodiment, the management apparatus 100 is communicable with the quality control apparatuses 302 included in the networks 300. In other words, the network system 10 has the management apparatus 100 which is not dependent on the carriers. The management apparatus 100 may be managed by a particular carrier from among the carriers. In other words, a particular carrier may operate the management apparatus 100. In such a case, the management apparatus 100 may be connected to the network 300, which is managed by the particular carrier, without the intermediation of the Internet 500 and may be connected to the networks 300, which is managed by the other carriers, via the Internet 500. When the management apparatus 100 is operated by a particular carrier, how the terminal apparatus 200 is controlled by the management apparatus MOS is not dependent on the carrier.

The management apparatus 100 is implemented by a computer system provided with a processor 110, a storage device 160, and a communication device 170. The elements of the management apparatus 100 are mutually connected by a single bus or by more than one bus for communicating information. Each of the elements of the management apparatus 100 may include a single piece of equipment or more than one piece of equipment. Some of the elements of the management apparatus 100 may be omitted.

The processor 110 controls the entire management apparatus 100 and it includes a single chip or more than one chip. The processor 110 includes an interface with peripheral devices and a central processor (CPU: Central Processing unit) including an arithmetic device, a register, etc. One, some, or all of the functions of the processor 110 may be implemented by hardware such as a Digital Signal Processor (DSP), an Application Specific Integrated Circuit (ASIC), a Programmable Logic Device (PLD), and a Field Programmable Gate Array (FPGA). The processor 110 executes various processes in parallel or sequentially.

The processor 110 acts as a quality manager 120 and a charge manager 130, for example, by reading a control program PRcl1 from the storage device 160 and executing the read control program PRcl1. The control program PRcl1 may be transmitted from another device via the network 300.

Figure 9:
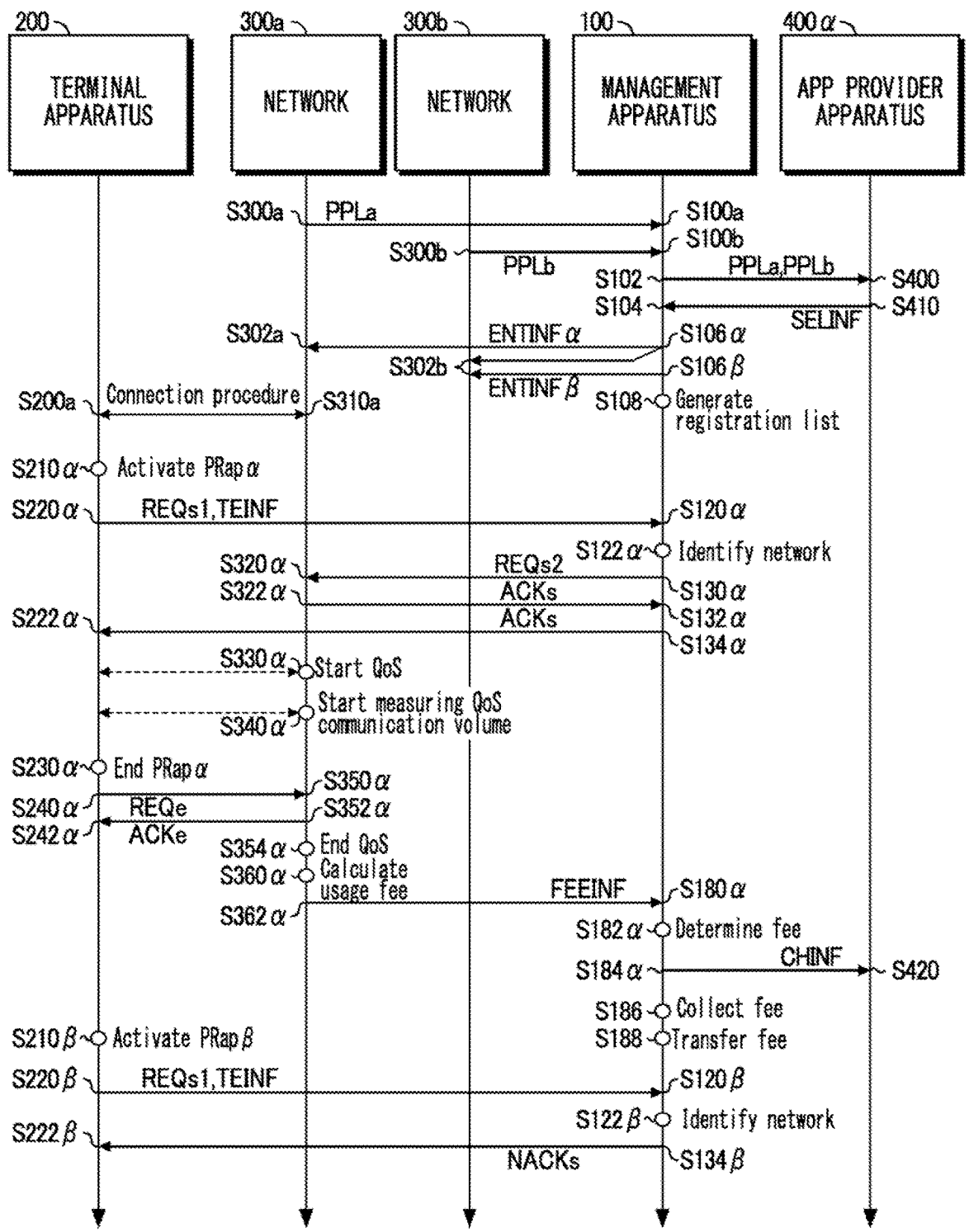
FIG. 9 is a sequence chart illustrating an example of procedures of the network system illustrated in FIG. 1.

The quality manager 120 acquires a control request REQs1, which requests the QoS control for the communication of the application program PRap installed in the terminal apparatus 200, and terminal information TEINF about the terminal apparatus 200 (see S120α in FIG. 9). Then, based on the terminal information TEINF acquired from the terminal apparatus 200, the quality manager 120 identifies, from among the networks 300, a network 300 that is currently connected to the terminal apparatus 200 for which the QoS control has been requested. On the basis of the terminal information TEINF, the quality manager 120 may identify, from among the carriers, one or more carriers that manage one or more networks 300 to which the terminal apparatus 200 serving as the transmission source of the control request REQs1 is connected. In this case, one or more networks 300 that are currently connected to the terminal apparatus 200 is identified. An example of the terminal information TEINF will be described below with reference to FIG. 4.

On the basis of a management table TBL, the quality manager 120 executes a control process for causing a controllable network 300 for the QoS control to start the QoS control from among the networks 300 that are currently connected to the terminal apparatus 200. Although details will be described in FIG. 2, the management table TBL stores, for each carrier, for example, access-destination information, which shows a destination to be accessed when the QoS control is to be requested, etc. For example, the quality manager 120 transmits, as a control request REQs2, the control request REQs1, which has been acquired from the terminal apparatus 200, to the quality control apparatus 302 of the controllable network 300 (see S130α of FIG. 9). As a result, the QoS control for the terminal apparatus 200 to which the QoS control has been requested is executed by the quality control apparatus 302 of the controllable network 300 from among the networks 300 that is currently connected to the terminal apparatus 200. Hereinafter, the control requests REQs1 and REQs2 may be generically referred to as control requests REQs.

Thus, the quality manager 120 executes the control process for causing at least one of the one or more networks 300 that are currently connected to the terminal apparatus 200 to execute the QoS control based on the control request REQs1 and the terminal information TEINF. Hereinafter, when some of the networks 300 that are currently connected to the terminal apparatus 200 is a controllable network 300, networks 300 excluding the controllable network 300 from among the networks 300 connected to the terminal apparatus 200 are referred to as non-controlled networks 300.

The control process may include, for example, a process of selecting a controllable network 300 from among the networks 300 that are currently connected to the terminal apparatus 200 based on the registration list LST. In the registration list LST, for example, the networks 300 which execute the QoS control are registered for each of the application programs PRap. The registration list LST is an example of a "list". An example of the registration list LST will be described below with reference to FIG. 6.

The controllable network 300 may be selected from the networks 300 that are currently connected to the terminal apparatus 200, based on the registration list LST and a quality mode of the QoS control. Examples of the quality mode include a large-capacity mode in which a larger amount of data can be transferred compared with other quality modes, a low-latency mode in which latency of communication is lower compared with the other quality modes, and a best effort mode in which control by best effort is carried out. In the QoS control of the large-capacity mode, the bandwidth control of the bandwidth guarantee in which the lower limit value of the bandwidth is set may be executed. In the QoS control of the low-latency mode, the low-latency control of the latency guarantee in which the upper limit value of latency is set may be executed. The quality mode may be designated by the terminal apparatus 200 or may be designated by a server such as the management apparatus 100. Alternatively, the quality mode may be designated by an apparatus (apparatus not shown, which is different from the quality control apparatus 302) included in the network 300. The designation of the quality mode may be designation of QoS Class Identifier (QCI) or may be designation of 5G QoS Identifier (5QI) used in a 5th generation mobile communication system (5G).

When the networks 300 that are currently connected to the terminal apparatus 200 include the non-controlled network 300, the quality manager 120 may transmit a negative acknowledgement NACKs to the terminal apparatus 200 as a response to the control request REQs for the non-controlled network 300 (see S134β in FIG. 9). The negative acknowledgement NACKs indicates that the QoS control corresponding to the control request REQs is not to be executed, and it indicates the control request REQs has been rejected. The process of transmitting the negative acknowledgement NACKs to the terminal apparatus 200 may be included in the control process.

The charge manager 130 acquires fee information FEEINF, which shows usage fees of the QoS control, from the networks 300 (see S180α in FIG. 9). Then, the charge manager 130 charges a fee based on the fee information FEEINF to the application provider, which provided the application program PRap to the terminal apparatus 200. For example, the charge manager 130 transmits charge information CHINF, which shows details (e.g., fee) of the charge based on the fee information FEEINF, to the app provider apparatus 400 (see S184α in FIG. 9). As a result, the application provider is charged.

The charge manager 130 may manage the registration list LST. The management of the registration list LST may include generation of the registration list LST, or it may include update (addition and deletion of the network 300 which executes the QoS control) of the registration list LST. Alternatively, the management of the registration list LST may include both of the creation and the update of the registration list LST, or it may include storing the registration list LST in the storage device 160.

For example, the charge manager 130 notifies the application providers of fee plans about usage of the QoS control. Each of the fee plans is associated with, for example, any of the networks 300. Two or more fee plans may be associated with the same network 300. The fee plans of the networks 300 determine, for example, relationships between usage volumes of the QoS control such as communication volumes (traffic volumes), which are objects of the QoS control, and usage fees. The application provider, for example, selects the network 300 which is to execute the QoS control from among the networks 300, based on the fee plans of the networks 300. The charge manager 130 registers the network 300, which has been selected by the application provider, in the registration list LST.

The storage device 160 is a recording medium which is readable by the processor 110 and stores various data such as programs including the control program PRcl1 executed by the processor 110, the management table TBL, and the registration list LST. The storage device 160 may include at least one of, for example, a Read Only Memory (ROM), an Erasable Programmable ROM (EPROM), an Electrically Erasable Programmable ROM (EEPROM), and a Random Access Memory (RAM). The storage device 160 may be referred to as a register, a cache, a main memory (main storage device), or the like.

The communication device 170 is hardware (transmission and reception device) for carrying out communication with other apparatuses such as the terminal apparatus 200 and the quality control apparatus 302 via the network 300. The communication device 170 is referred to as, for example, a network device, a network controller, a network card, or a communication module. The communication device 170 may include, for example, a high-frequency switch, a duplexer, a filter, and a frequency synthesizer in order to realize one or both of Frequency Division Duplex (FDD) and Time Division Duplex (TDD).

The terminal apparatus 200 may employ a freely selected information processor, and the terminal apparatus 200 may be a stationary pieces of information equipment such as a personal computer or may be a portable information terminal such as a smartphone, a laptop computer, a wearable terminal, or a tablet terminal. In the following description, the terminal apparatus 200 is a smartphone.

The terminal apparatus 200 is implemented, for example, by a computer system provided with a processor 210, a storage device 260, a communication device 270, an input device 280, and an output device 290. The processor 210 controls the entire terminal apparatus 200 and is built in substantially the same manner as the processor 110 of the above described management apparatus 100. For example, the processor 210 acts as a controller (not shown) which controls the entire terminal apparatus 200 by reading a control program PRcl2 from the storage device 260 and executing the read control program PRcl2.

The processor 210 acts as a requester 220, etc. by reading the application program PRap for implementing one or more predetermined functions, from the storage device 260 and executing the read application program PRap. In FIG. 1, descriptions of functional blocks are omitted except for the requester 220, which is related to requests of the QoS control, from among the functional blocks implemented by execution of the application program PRap. The control program PRcl2 and the application program PRap may be transmitted from another apparatus via the network 300.

For example, when the QoS control is to be requested, the requester 220 transmits the control request REQs1 and the terminal information TEINF to the management apparatus 100. The request for the QoS control may be invoking of a start Application programming Interface (API) of the QoS control. The requester 220 may send a request for the QoS control to the management apparatus 100 by execution of invoking of the start API of the QoS control for the management apparatus 100.

The control request REQs1 transmitted from the requester 220, which has been implemented by executing the application program PRapα, requests the QoS control for the communication of the application program PRapα. Similarly, the control request REQs1 transmitted from the requester 220, which has been implemented by executing the application program PRapβ, requests the QoS control for the communication of the application program PRapβ.

In this embodiment, when termination of the QoS control is to be requested, the requester 220 transmits a termination request REQe, which requests termination of the QoS control, to the quality control apparatus 302 (see S240α in FIG. 9). The request for termination of the QoS control may be invoking of a termination API of the QoS control. The requester 220 may request termination of the QoS control to the quality control apparatus 302 by executing invoking of the termination API of the QoS control for the quality control apparatus 302. The requester 220 may transmit the termination request REQe to the quality control apparatus 302 via the management apparatus 100. In this embodiment, transmitting the control request REQs also includes invoking the start API of the QoS control, and transmitting the termination request REQe includes invoking the termination API of the QoS control. Hereinafter, the request for the QoS control may be referred to a request to start the QoS control in opposition to the request to terminate the QoS control.

The storage device 260 is a recording medium which is readable by the processor 210 and stores various data such as programs including the control program PRcl2 executed by the processor 210. In the example illustrated in FIG. 1, other than the control program PRcl2, the application programs PRapα and PRapβ are stored in the storage device 260. In substantially the same way as in the storage device 160, the storage device 260 includes at least one of, for example, a ROM, an EPROM, an EEPROM, and a RAM.

The communication device 270 is hardware (transmission and reception device) for carrying out communication with other apparatuses, such as the management apparatus 100 and the quality control apparatus 302, via the network 300 and is built in substantially the same way as in the communication device 170.

The input device 280 receives input from other devices. Examples of the input device 280 include a keyboard, a mouse, a microphone, a switch, a button, and a sensor. For example, the input device 280 receives (i) input operations for inputting symbols, such as numbers and characters to the processor 210, and (ii) input operations for selecting one or more icons displayed on a display surface of the terminal apparatus 200. For example, a touch screen which detects contact on the display surface of the terminal apparatus 200 is suitable as the input device 280. The input device 280 may include input devices for a user.

The output device 290 is, for example, a display, and it carries out output to outside devices. The output device 290 displays images under the control of the processor 210. Any of various display panels, such as liquid-crystal display panels and organic Electro luminescent (EL) display panels, may be suitably used as the output device 290. The input device 280 and the output device 290 may be integrally built (e.g., a touch screen). The output device 290 may be an output device which has a speaker and a Light Emitting Diode (LED) lamp.

The quality control apparatus 302 is, for example, an information processing device such as a server and executes the QoS control. The quality control apparatus 302 communicates with the management apparatus 100 and the terminal apparatus 200. For example, when the control request REQs2 is received, the quality control apparatus 302 executes the QoS control for the communication of the application program PRap which is designated by the control request REQs2 from among the communication carried out by the terminal apparatus 200, which has requested the QoS control. The QoS control to be executed for the communication of the application program PRap is one with the quality mode designated by the control request REQs2.

For example, when the QoS control of quality mode designated by the control request REQs2 is to be executed, the quality control apparatus 302 transmits a positive acknowledgement ACKs for the control request REQs2, to the terminal apparatus 200 via the management apparatus 100 (see S322α in FIG. 9). The quality control apparatus 302 may transmit the positive acknowledgement ACKs to each of the management apparatus 100 and the terminal apparatus 200. When the QoS control of quality mode designated by the control request REQs2 cannot be executed, the quality control apparatus 302 transmits the negative acknowledgement NACKs for the control request REQs2, to the terminal apparatus 200. The quality control apparatus 302 may transmit the negative acknowledgement NACKs to the terminal apparatus 200 via the management apparatus 100.

Herein, whether the QoS control of quality mode designated by the control request REQs2 is executable may be determined based on QoS-usage determination information. The QoS-usage determination information includes one, some, or all of network information related to the networks 300, API information related to the QoS control, provider information of the communication services, and degree-of-urgency information. Examples of the network information and the API information will be described below with reference to FIG. 5. The provider information is used to determine whether the communication service provided to the terminal apparatus 200 is the communication service provided by a virtual mobile carrier. The degree-of-urgency information shows the degrees of urgency of the communication (e.g., when it is in a time of disaster or not). The QoS-usage determination information may include one or more items other than the above described items.

The quality control apparatus 302 calculates the usage fee of the QoS control based on, for example, the communication volume (traffic volume) of the communication which serves as the object of the QoS control. Then, the quality control apparatus 302 transmits the fee information FEEINF, which shows the usage fee of the QoS control, to the management apparatus 100. The timing to transmit the fee information FEEINF to the management apparatus 100 may be the timing determined in advance (e.g., day X of each month from January to December) or may be the timing depending on a request from the management apparatus 100.

In FIG. 1, the configuration of the quality control apparatus 302 is not particularly shown. However, in a manner substantially the same as that for the management apparatus 100, the quality control apparatus 302 is implemented by a computer system provided with a processor which controls the entire quality control apparatus 302, a storage device which stores various data, and a communication device for carrying out communication with other apparatuses. The quality control apparatus 302 may be implemented as a single apparatus or may be implemented as a group of separately constructed devices (in other words, a system). In the quality control apparatus 302, a function to receive the control request REQs2, etc., a function to execute the QoS control, a function to calculate the usage fee of the QoS control, etc., may be implemented as single devices or may be implemented as a group of two or more devices, which are separately constructed. Alternatively, the quality control apparatus 302 may have devices which execute the QoS control.

As described above, the app provider apparatus 400 executes, for the management apparatus 100, a procedure about usage of QoS, such as payment of the usage fee of the QoS control. The app provider apparatus 400 may have a function to provide the application program PRap. The app provider apparatus 400 may download the application program PRap to the terminal apparatus 200 in response to a request to download the application program PRap.

In FIG. 1, the configuration of the app provider apparatus 400 is not shown. However, in substantially the same manner as for the management apparatus 100, the app provider apparatus 400 may be implemented by a computer system provided with a processor which controls the entire app provider apparatus 400, a storage device which stores various data, and a communication device for carrying out communication with other apparatuses. The app provider apparatus 400 may be implemented as a single apparatus, or it may be implemented separately constructed devices. Any function to carry out the procedure about usage of QoS, and other functions (e.g., a function to provide the application program PRap) may be implemented by the same device, or they may be implemented by different devices.

The configurations of the management apparatus 100, the terminal apparatus 200, the quality control apparatus 302, and the app provider apparatus 400 are not limited to the examples illustrated in FIG. 1. In a manner similar to that for the terminal apparatus 200, the management apparatus 100 may have an input device and an output device. The management apparatus 100 may have an auxiliary storage device. The auxiliary storage device is a recording medium readable by the management apparatus 100. The auxiliary storage device may include at least one of optical disks such as Compact Disc ROMs (CD-ROMs), hard disk drives, flexible disks, magneto optical disks (e.g., compact disks, digital versatile disks, and Blu-ray (registered tradename) disks), smart cards, flash memories (e.g., cards, sticks, and key drives), floppy (registered tradename) disks, and magnetic strips. Similarly, one, some, or all of the terminal apparatus 200, the quality control apparatus 302, and the app provider apparatus 400 may have an auxiliary storage device. The auxiliary storage device may be referred to as a storage.

The quality control apparatus 302 is only required to be able to execute the QoS control in the corresponding network 300, and whether the network 300 is defined without including the quality control apparatus 302 is not particularly limited.

FIG. 2 is an explanatory diagram illustrating an example of the management table TBL illustrated in FIG. 1. In the management table TBL, for example, carrier individual information CAINF including the information necessary for the quality manager 120 to execute the control process is stored for each carrier.

For example, the management table TBL has records which correspond to the carriers, respectively. In each of the records of the management table TBL, for example, a carrier ID for identifying each carrier from among the carriers and the carrier individual information CAINF of the carrier indicated by the carrier ID is stored.

The carrier individual information CAINF includes the API information related to the API, which has been notified to the management apparatus 100 by the carrier, and the access-destination information, which shows the destination to be accessed when start of the QoS control or the like is requested. The API information and the access-destination information may be disclosed by one or more of the carriers. An example of the API information will be described below with reference to FIG. 3. The access-destination information may be an Internet Protocol (IP) address of the quality control apparatus 302 or may be a Uniform Resource Locator (URL) of the API. The access-destination information may be included in the API information.

The management apparatus 100 transmits the control request REQs2 to the quality control apparatus 302 of the controllable network 300 based on the carrier individual information CAINF of the carrier managing the controllable network 300. The carrier managing the controllable network 300 manages the quality control apparatus 302 which is the transmission destination of the control request REQs2.

The management table TBL is not limited to the example shown in FIG. 2. For example, when a plurality of carriers includes a single carrier which manages two or more of the networks 300, two or more mutually different carrier IDs may be allocated to the single carrier. The two or more carrier IDs allocated to the single carrier, for example, correspond to the two or more networks 300, which are managed by the single carrier, respectively. In other words, the management table TBL has the records which correspond to the networks 300, which are each managed by one or more carriers. Herein, managing the two or more networks 300 by a single carrier may be managing, by the single carrier, the two or more networks 300 for which the destination to be accessed (access-destination information) when start of the QoS control is requested are different.

FIG. 3 is an explanatory diagram illustrating an example of the API information.

The API information includes information related to a request to start the QoS control, a request to terminate the QoS control, confirmation of the state of the QoS control, confirmation of whether the QoS control can be used, and acquisition of SIM information. Furthermore, the API information includes one, some, or all of request mode types, requested communication quality, SIM information, user apparatus information, area information related to the area in which the terminal apparatus 200 exists, and unique functions of the carrier.

The request mode type is, for example, the quality mode of the QoS control requested to the quality control apparatus 302. The requested communication quality is implemented by the QoS control requested to the quality control apparatus 302, or it serves as a target. Examples of the communication quality include throughput, latency time, jitter, frame rates, and packet loss rates. The SIM information is stored in a SIM. The user apparatus information is stored in the terminal apparatus 200. An example of the SIM information and the user apparatus information will be described below with reference to FIG. 4.

The area information includes one, some, or all of location information showing the location of the terminal apparatus 200, map information of the area in which the terminal apparatus 200 exists, base-station information related to a base station in the area in which the terminal apparatus 200 exists, weather information of the area in which the terminal apparatus 200 exists, shielding information related to an object that shields radio waves around the terminal apparatus 200, and information showing presence or absence of a failure notification about the communication in the area in which the terminal apparatus 200 exists. The area information may include one or more items in addition to the above described items. In one example, the unique function of the carrier differs from a function which is common to the other carriers, and it is uniquely added by the carrier.

The items included in the API information are not limited to the examples illustrated in FIG. 3. For example, the API information is not required to include some of the items illustrated in FIG. 3. Alternatively, the API information may include one, some, or all of the items illustrated in FIG. 3 and one or more items (e.g., the access-destination information described in FIG. 2) other than the items illustrated in FIG. 3. The items included in the API information may be included in the QoS-usage determination information as in FIG. 1.

FIG. 4 is an explanatory diagram illustrating an example of the terminal information TEINF. The terminal information TEINF includes SIM information and user apparatus information.

For example, the SIM information is referenced by the management apparatus 100 to identify the carrier which is providing the communication service to the terminal apparatus 200, which has transmitted the control request REQs. For example, the SIM information includes one, some, or all of: International Mobile Subscriber Identity (IMSI), Mobile Subscriber Integrated Services Digital Network Number (MSISDN), Integrated Circuit Card ID (ICCID), contract information, and a contract state. The items included in the SIM information are not limited to the examples illustrated in FIG. 4. The SIM information may include one, some, or all of the items illustrated in FIG. 4 and the items other than the items illustrated in FIG. 4.

Substantially the same as the SIM information, the user apparatus information may be referenced by the management apparatus 100 to identify the carrier which is providing the communication service to the terminal apparatus 200, which has transmitted the control request REQs. The user apparatus information includes one, some, or all of: an IP address of the terminal apparatus 200, a model name of the terminal apparatus 200, application information, corresponding server information, corresponding user apparatus information, signature information, package information, OS information related to an Operating System (OS) of the terminal apparatus 200, memory information related to a memory of the terminal apparatus 200, CPU information related to a CPU of the terminal apparatus 200, a usage rate of the CPU, a usage rate of the memory, and identification information related to the user.

For example, the IP address of the terminal apparatus 200 is given to the terminal apparatus 200 in order to use the communication service provided by the carrier and to identify the carrier and the network 300. The application information shows a name of the application program PRap executed in the terminal apparatus 200, etc. The identification information of the user refers to information (e.g., fingerprints, iris, face, and password) used to authenticate the user. The items included in the user apparatus information are not limited to the examples illustrated in FIG. 4. The user apparatus information may include one, some, or all of the items illustrated in FIG. 4 and items other than the items illustrated in FIG. 4.

The items included in the terminal information TEINF are not limited to the examples illustrated in FIG. 4. For example, the terminal information TEINF is not required to include either one of the SIM information and the user apparatus information. Alternatively, the terminal information TEINF may include (i) one of or both of the SIM information and the user apparatus information, (ii) the information (e.g., the network information shown in FIG. 5) other than the SIM information, and (iii) the user apparatus information.

FIG. 5 is an explanatory diagram illustrating an example of the network information. The items included in the network information are included in the QoS-usage determination information as in FIG. 1. The items included in the network information are referenced by the quality control apparatus 302 when the quality control apparatus 302 is to determine whether the QoS control of quality mode designated by the control request REQs2 is executable. Also, the items included in the network information may be included in the terminal information TEINF. In such a case, a base station included in the network 300 may add the network information to the terminal information TEINF, which is transmitted from the terminal apparatus 200 to the management apparatus 100 via the network 300.

The network information includes one, some, or all of 5-tuple information, Access Point Names (APN), communication system information, communication quality, a working rate of a base station, availability of the base station, and the number of concurrent connections to the base station. The 5-tuple information includes a transmission-source IP address, a target IP address, a transmission-source port number, a target port number, and a protocol ID. The communication system information shows one or more communication systems such as a 3rd generation mobile communication system (3G), a 4th generation mobile communication system (4G), a 5th generation mobile communication system (5G), a wireless Local Area Network (LAN), tethering, and wired communication.

The items included in the network information are not limited to the examples illustrated in FIG. 5. The network information may include one, some, or all of the items illustrated in FIG. 5 and the items other than the items illustrated in FIG. 5. When the network information is included in the terminal information TEINF, the items of the network information included in the QoS-usage determination information may be different from the items of the network information included in the terminal information TEINF. When the network information is included in the terminal information TEINF, the quality manager 120 may identify networks 300 that are currently connected to the terminal apparatus 200 from among the networks 300, based on the network information (e.g., APN) included in the terminal information TEINF.

One, some, or all of the items included in the API information described in FIG. 3 may be included in one of or both of the terminal information TEINF and the network information. Furthermore, one, some, or all of the items included in the terminal information TEINF described in FIG. 4 may be included in one of or both of the API information and the network information. Furthermore, one, some, or all of the items included in the network information described in FIG. 5 may be included in one of or both of the API information and the terminal information TEINF.

FIG. 6 is an explanatory diagram illustrating an example of the registration list LST. In the registration list LST, the one or more networks 300 which executes the QoS control are registered for each of the application programs PRap. In the registration list LST illustrated in FIG. 6, network IDs of the networks 300, which execute the QoS control for the communication of the application programs PRap, are associated with application IDs of the application programs PRap.

The application ID is an identifier and identifies each application program PRap from among the application programs PRap. The network ID is an identifier and identifies each network 300 from among the networks 300.

For example, "APα" in FIG. 6 represents the application program PRapα, and "APβ" in FIG. 6 represents the application program PRapβ. "NWa" in FIG. 6 represents the network 300a, and "NWb" in FIG. 6 represents the network 300b.

In the example illustrated in FIG. 6, the networks 300a and 300b are registered in the registration list LST as the networks 300 which execute the QoS control for the application program PRapα. The network 300b is registered in the registration list LST as the network 300 which executes the QoS control for the application program PRapβ. In other words, in the example illustrated in FIG. 6, the networks 300a and 300b are registered in the list of the application program PRapα in the registration list LST1. The network 300b is registered in the list of the application program PRapβ in the registration list LST. Hereinafter, the list of each application program PRap in the registration list LST will be referred to as the registration list LST of the application program PRap.

FIG. 7 is an explanatory diagram illustrating an example of the fee information FEEINF. A terminal apparatus ID is an identifier and identifies each terminal apparatus 200 from among the terminal apparatuses 200.

In the example illustrated in FIG. 7, the usage fees of the QoS control for each application program PRap executed by the terminal apparatuses 200 are recorded for each application program PRap.

FIG. 8 is an explanatory diagram illustrating another example of the fee information FEEINF. In the example illustrated in FIG. 8, the usage fees of the QoS control for the application programs PRap executed by the terminal apparatuses 200 are recorded for each terminal apparatus 200.

In FIGS. 7 and 8, the group of the individual fee information in which the application programs PRap, the terminal apparatuses 200, and the usage fees are mutually associated is illustrated as an example of "fee information". However, each piece of individual fee information is an example of "fee information". For example, in FIGS. 7 and 8, the following information are examples of the "fee information": (i) each individual fee information including the individual fee information in which APα, TE001, and the usage fee (JPY 2,345) are mutually associated, and (ii) the individual fee information in which APα, TE002, and the usage fee (JPY 0) are mutually associated.

FIG. 9 is a sequence chart illustrating an example of procedures of the network system 10 illustrated in FIG. 1. In the example illustrated in FIG. 9, a case is given in which the terminal apparatus 200 which transmits the control request REQs1 is connected only to the network 300a from among the networks 300a and 300b. The transmission destination of the control request REQs1 (the address of the management apparatus 100) does not depend on the carriers, but is common to the carriers. In the example illustrated in FIG. 9, the description of the app provider apparatus 400β is omitted to facilitate understanding of the drawing.

First, the management apparatus 100 acquires plan information PPL (PPLa, PPLb), which shows the fee plans of the networks 300 (300a, 300b), from the networks 300. For example, the quality control apparatus 302a of the network 300a transmits the plan information PPLa to the management apparatus 100 (S300a), and the quality control apparatus 302b of the network 300b transmits the plan information PPLb to the management apparatus 100 (S300b). As a result, the charge manager 130 of the management apparatus 100 acquires the plan information PPLa of the network 300a and the plan information PPLb of the network 300b (S100a and S100b). Then, the charge manager 130 transmits the plan information PPLa and PPLb, which has been acquired from the networks 300a and 300b, to the app provider apparatuses 400α and 400β (S102). As a result, for example, the app provider apparatus 400α receives the plan information PPL of the networks 300 (S400).

In this manner, the management apparatus 100 notifies the application provider of the fee plans of the networks 300 by transmitting the plan information PPL of the networks 300 to the app provider apparatus 400 of the application provider. The application provider determines, based on the fee plans of the QoS control, the QoS control of which carrier is to be used from among the carriers. More specifically, the application provider selects, based on the fee plans of the QoS control, the network 300 which is to execute the QoS control for the communication of the application program PRap from among the networks 300. Then, the application provider applies for usage of the QoS control by notifying the management apparatus 100 of the network 300 which has been selected as the network 300 to execute the QoS control. For example, the app provider apparatus 400 transmits, to the management apparatus 100, selection information SELINF showing the network 300 which has been selected as the network 300 to execute the QoS control (S410). As a result, the charge manager 130 of the management apparatus 100 acquires, for each application program PRap, the selection information SELINF which shows the network 300 selected as the network 300 which is to execute the QoS control (S104).

In the example illustrated in FIG. 9, a case is given in which the networks 300a and 300b are selected by the application provider which provides the application program PRapα, as the networks 300 which is to execute the QoS control for the communication of the application program PRapα. Furthermore, in the example illustrated in FIG. 9, a case is given in which the network 300b is selected by the application provider which provides the application program PRapβ, as the network 300 which is to execute the QoS control for the communication of the application program PRapβ

The charge manager 130 of the management apparatus 100 transmits entry information ENTINFα, which shows that an application for QoS usage for the communication of the application program PRapα has been received from the application provider, to the networks 300a and 300b (S106α). Similarly, the charge manager 130 transmits entry information ENTINFβ, which shows that an application for QoS usage for the communication of the application program PRapβ has been received from the application provider, to the network 300b (S100).

As a result, for example, the quality control apparatus 302a of the network 300a acquires the entry information ENTINFα (S302a). The quality control apparatus 302b of the network 300b acquires the entry information ENTINFα and ENTINFβ (S302b). The charge manager 130 may transmit the entry information ENTINF including the entry information ENTINFα and ENTINFβ to the network 300b instead of transmitting each of the entry information ENTINFα and ENTINFβ to the network 300b. Furthermore, the selection information SELINF and the entry information ENTINF may include the information showing the fee plan selected by the application provider.

The charge manager 130 of the management apparatus 100 generates the registration list LST based on the selection information SELINF (S108). In the example illustrated in FIG. 9, as described above, the networks 300a and 300b are selected as the networks 300 which is to execute the QoS control for the communication of the application program PRapα. Furthermore, the network 300b is selected as the network 300 which is to execute the QoS control for the communication of the application program PRapβ. Therefore, in step S108 illustrated in FIG. 9, for example, the registration list LST which is substantially the same as the lists of the application programs PRapα and PRapβ in the registration list LST illustrated in FIG. 6 is generated.

In the example illustrated in FIG. 9, the terminal apparatus 200 is connected only to the network 300a from among the networks 300a and 300b. As a result, processes about a connection procedure are executed between the terminal apparatus 200 and the network 300a (S200a and S310a).

Examples of the processes about the connection procedure include a process carried out until the terminal apparatus 200 finds the network 300a, which exists therearound, a process of establishing a Radio Resource Control (RRC) connection, an Attach request from the terminal apparatus 200, and a response from the network 300a to the Attach request. The Attach request is, for example, a connection request to the network 300a.

The terminal apparatus 200 activates the application program PRapα (S210α). Then, the requester 220 of the terminal apparatus 200 transmits the control request REQs1 and the terminal information TEINF to the management apparatus 100 via the network 300a (S220α). The control request REQs1, which has been transmitted in response to the activation of the application program PRapα, requests the QoS control for the communication of the application program PRapα.

The quality manager 120 of the management apparatus 100 acquires the control request REQs1 and the terminal information TEINF which has been transmitted from the terminal apparatus 200 to the management apparatus 100 via the network 300a (S120α). Then, on the basis of the terminal information TEINF acquired from the terminal apparatus 200, the quality manager 120 identifies, from among the networks 300, networks 300 that are currently connected to the terminal apparatus 200, which is the transmission source of the control request REQs1 (S122α). For example, the quality manager 120 identifies, based on the IP address included in the terminal information TEINF, the network 300 which are currently connected to the terminal apparatus 200 from among the networks 300.

The quality manager 120 may identify, based on the terminal information TEINF, the carrier managing the networks 300 that are currently connected to the terminal apparatus 200, to identify networks 300 that are currently connected to the terminal apparatus 200. Specifically, the quality manager 120 may identify the carrier of the network 300a based on the IP address included in the terminal information TEINF. Alternatively, the quality manager 120 may identify the carrier of the network 300a based on the SIM information (e.g., ICCID) included in the terminal information TEINF.

Then, for example, the quality manager 120 determines whether the network 300a, which has been identified based on the terminal information TEINF, is registered in the registration list LST as the network 300, which is to execute the QoS control for the communication of the application program PRapα. In the example illustrated in FIG. 9, the network 300a is registered in the registration list LST as the network 300 which is to execute the QoS control for the communication of the application program PRapα. Therefore, in the example illustrated in FIG. 9, the quality manager 120 determines the network 300a, which is currently connected to the terminal apparatus 200, as a controllable network 300. In the example illustrated in FIG. 9, the network 300b is registered in the registration list LST as the network 300 which is to execute the QoS control for the communication of the application program PRapα, but is not connected to the terminal apparatus 200. Therefore, this network 300b is not included in the controllable networks 300.

The quality manager 120 determines the network 300a as the controllable network 300 and then transmits the control request REQs2 to the quality control apparatus 302a of the network 300a based on the carrier individual information CAINF corresponding to the network 300a (S130α).

In this embodiment, a case is given in which the control request REQs2 is transmitted from the quality manager 120 of the management apparatus 100 to the quality control apparatus 302 of the controllable network 300. The control request REQs2 includes the items included in the control request REQs1 acquired from the terminal apparatus 200. The control request REQs2 may include one, some, or all of the items included in the API information illustrated in FIG. 3 and the items included in the control request REQs1. Therefore, transmitting the control request REQs2 to the quality control apparatus 302 includes transmitting the control request REQs1 to the quality control apparatus 302. In other words, the control process executed by the quality manager 120 may include the process of transmitting the control request REQs1, which has been acquired from the terminal apparatus 200, to the quality control apparatus 302.

The quality control apparatus 302a of the network 300a receives the control request REQs2 which has been transmitted from the management apparatus 100 (S320α). Then, the quality control apparatus 302a determines, based on the QoS-usage determination information, whether the QoS control of quality mode designated by the control request REQs2 is executable. In the example illustrated in FIG. 9, a case is given in which the quality control apparatus 302a executes the QoS control of quality mode designated by the control request REQs2. Therefore, the quality control apparatus 302a transmits the positive acknowledgement ACKs for the control request REQs2, (the information showing that the QoS control corresponding to the control request REQs is executable) to the management apparatus 100 (S322α). The quality control apparatus 302a may transmit the positive acknowledgement ACKs for the control request REQs2, to the terminal apparatus 200 and the management apparatus 100.

The quality manager 120 of the management apparatus 100 receives the positive acknowledgement ACKs for the control request REQs2, (S132α). Then, the quality manager 120 transmits the positive acknowledgement ACKs to the terminal apparatus 200 (S134α).

The quality control apparatus 302a of the network 300a starts the QoS control based on the control request REQs2 (S330α). For example, the quality control apparatus 302a starts the QoS control of quality mode, which is designated by the control request REQs2 for the communication of the application program PRapα from among the communication of the terminal apparatus 200. As a result, the QoS control for the communication of the application program PRapα is started. Furthermore, the quality control apparatus 302a of the network 300a starts measuring the communication volume of the communication of the application program PRapα (the communication serving as the object of the QoS control) (S340α).

The terminal apparatus 200 terminates the application program PRapα (S230α). As a result, the application program PRapα terminates after the termination request REQe, which requests termination of the QoS control for the communication of the application program PRapα, is transmitted to the quality control apparatus 302a of the network 300a. For example, the requester 220 of the terminal apparatus 200 transmits the termination request REQe to the quality control apparatus 302a of the network 300a (S240α). The requester 220 may transmit the termination request REQe to the quality control apparatus 302a and the management apparatus 100, or it may transmit the termination request REQe to the quality control apparatus 302a via the management apparatus 100. The information for accessing the quality control apparatus 302a (the address or the like of the quality control apparatus 302a) may be included in the positive acknowledgement ACKs, or it may be transmitted from the management apparatus 100 to the terminal apparatus 200.

The quality control apparatus 302a of the network 300a receives the termination request REQe from the terminal apparatus 200 (S350α). Then, the quality control apparatus 302a transmits the positive acknowledgement ACKe for the termination request REQe, to the terminal apparatus 200 (S352α). As a result, the terminal apparatus 200 receives the positive acknowledgement ACKe for the termination request REQe, from the quality control apparatus 302a (S242α). The quality control apparatus 302a terminates the QoS control indicated by the termination request REQe, in other words, the QoS control for the communication of the application program PRapα (S354α).

The quality control apparatus 302a may transmit the positive acknowledgement ACKe for the termination request REQe, to the terminal apparatus 200 and the management apparatus 100. Alternatively, the quality control apparatus 302a may transmit the positive acknowledgement ACKe for the termination request REQe, to the terminal apparatus 200 via the management apparatus 100. In such a case, the management apparatus 100 can recognize the termination of the QoS control for the communication of the application program PRapα installed in the terminal apparatus 200.

The quality control apparatus 302a of the network 300a calculates the usage fee of the QoS control for the communication of the application program PRapα based on the communication volume of the communication of the application program PRapα (the communication serving as the object of the QoS control) (S360α). Then, the quality control apparatus 302a transmits the fee information FEEINF, which shows the calculated usage fee of the QoS control, to the management apparatus 100 (S362α). For example, the usage fee of the QoS control may be the fee obtained by subtracting a predetermined amount of money of a sales campaign or the like from the fee, which has been calculated based on the communication volume of the communication serving as the object of the QoS control.

The charge manager 130 of the management apparatus 100 acquires the fee information FEEINF, which shows the usage fee of the QoS control by the network 300a, from the networks 300a (S180α). Then, the charge manager 130 determines, based on the fee information FEEINF acquired from the network 300a, a fee on the application provider as the usage fee of the QoS control (S182α). The fee charged on the application provider as the usage fee of the QoS control may be the same as that shown by the fee information FEEINF transmitted from the network 300 to the management apparatus 100. Alternatively, the fee may differ from the usage fee of the QoS control shown by the fee information FEEINF. The fee may be obtained by adding a service fee of the management apparatus 100 to the usage fee of the QoS control shown by the fee information FEEINF. Alternatively, the fee may be obtained by subtracting a predetermined amount of money of a sales campaign or the like from the usage fee of the QoS control shown by the fee information FEEINF.

The charge manager 130 of the management apparatus 100 transmits the charge information CHINF, which shows the fee which has been determined based on the fee information FEEINF, to the app provider apparatus 400α (S184α). As a result, the app provider apparatus 400α receives the charge information CHINF from the management apparatus 100 (S420).

In the example illustrated in FIG. 9, the usage fee of the QoS control for the communication of the application program PRapα is charged to the application provider, which provides the application program PRapα, by transmitting the charge information CHINF from the management apparatus 100 to the app provider apparatus 400α.

The charge manager 130 of the management apparatus 100 collects the fee for the usage of the QoS control, from the application provider (S186). For example, the application provider transfers the fee for the usage of the QoS control, to the management apparatus 100 based on the charge information CHINF. The transfer of the fee to the management apparatus 100 may be executed by using the app provider apparatus 400.

The charge manager 130 of the management apparatus 100 transfers one, some, or all of the fees, which have been transferred from the application provider, to the respective carriers based on the fee information FEEINF acquired from the respective networks 300 (S188).

The usage fee of the QoS control transferred to each carrier may be obtained by subtracting the service fee or the like of the management apparatus 100 from the fee, which has been transferred from the application provider. When the fee obtained by subtracting the service fee of the management apparatus 100 from the fee, which has been transferred from the application provider, is JPY 0, the carrier may be notified that the payment for the QoS control is JPY 0. One, some or all of the processes about charging (e.g., S360α, S362α, S180α, S182α, S184α, S186, S188, and S420) may be executed in real time, or they may be executed every time the QoS control is ended. Alternatively, one, some, or all of the processes about charging (e.g., S360α, S362α, S180α, S182α, S184α, S186, S188, and S420) may be periodically executed.

The terminal apparatus 200 activates the application program PRapβ (S210β). Then, the requester 220 of the terminal apparatus 200 transmits the control request REQs1 and the terminal information TEINF to the management apparatus 100 via the network 300a (S220β). The control request REQs1, which has been transmitted in response to the activation of the application program PRapβ, requests the QoS control for the communication of the application program PRapβ.

The quality manager 120 of the management apparatus 100 acquires the control request REQs1 and the terminal information TEINF which has been transmitted from the terminal apparatus 200 to the management apparatus 100 via the network 300a (S120β). Then, based on the terminal information TEINF acquired from the terminal apparatus 200, the quality manager 120 identifies, from among the networks 300, the network 300 that is currently connected to the terminal apparatus 200, which is the transmission source of the control request REQs1 (S122β). For example, the quality manager 120 identifies the network 300a from among the networks 300 as the network 300 that is currently connected to the terminal apparatus 200 based on the IP address included in the terminal information TEINF.

Then, the quality manager 120 determines whether the network 300a, which has been identified based on the terminal information TEINF, is registered in the registration list LST as the network 300, which is to execute the QoS control for the communication of the application program PRapβ. In the example illustrated in FIG. 9, the network 300a is not registered in the registration list LST as the network 300 which is to execute the QoS control for the communication of the application program PRapβ. Therefore, in the example illustrated in FIG. 9, the quality manager 120 transmits the negative acknowledgement NACKs to the terminal apparatus 200 as the information which shows that the request (control request REQs1) of the QoS control for the communication of the application program PRapβ has been rejected (S134β). In the example illustrated in FIG. 9, the network 300b is registered in the registration list LST as the network 300 which is to execute the QoS control for the communication of the application program PRapβ. However, the network 300b is not connected to the terminal apparatus 200, and the QoS control is therefore not executed.

The quality manager 120 does not transmit the control request REQs2 to the network 300a for which usage of the QoS for the application program PRap indicated by the control request REQs1 has not been applied. As a result, execution of the QoS control can be prevented in the network 300 for is which usage of the QoS has not been applied.

In this manner, in this embodiment, the terminal apparatus 200 can cause the quality control apparatus 302, which is included in the appropriate network 300 from among the networks 300 that are currently connected to the terminal apparatus 200, to start the QoS control by transmitting the control request REQs1 to the management apparatus 100. In other words, the terminal apparatus 200 can cause the quality control apparatus 302 to start the QoS control without particularly recognizing the carrier providing the communication service. As a result, in this embodiment, the application program PRap which requests execution of the QoS control can be prevented from becoming complex.

The application provider, which provides the application program PRap, may include a QoS control Software Development Kit (SDK), which is for using the QoS control, in the application program PRap in order to use the QoS control. The transmission destination of the control request REQs1 is the management apparatus 100 regardless of the carrier which manages the network 300 connected to the terminal apparatus 200 in which the application program PRap is installed. As a result, in this embodiment, for all of the networks 300 managed by the plurality of carriers, the transmission destination of the control request REQs1 is not required to be changed depending on the carriers when the application program PRap which can request execution of the QoS control is generated. Therefore, in this embodiment, the application program PRap can be prevented from becoming complex. In other words, in this embodiment, when the application provider generates the application program PRap to enable requesting execution of the QoS control for any of the carriers, the application program PRap can be prevented from becoming complex.

In this embodiment, the application provider executes, for the management apparatus 100, procedures about usage of QoS, such as an application to use QoS for the carriers, and payment of the usage fee of the QoS control. As a result, in this embodiment, even when there is a probability that the terminal apparatus 200 will be connected to the networks 300, the procedures about usage of QoS by the application provider can be prevented from becoming complex.

The procedures of the network system 10 are not limited to the example illustrated in FIG. 9. The terminal apparatus 200 may be concurrently connected to the networks 300a and 300b. In such a case, the quality manager 120 of the management apparatus 100 identifies the network 300, which is currently connected to the terminal apparatus 200, based on the terminal information TEINF which has been transmitted from the terminal apparatus 200 within a predetermined period. When the terminal apparatus 200 is connected to the networks 300, the terminal apparatus 200 may transmit the control request REQs1 and the terminal information TEINF to the management apparatus 100 for each of the networks 300 which are currently connected to the terminal apparatus 200. The terminal information TEINF transmitted from the terminal apparatus 200 to the management apparatus 100 via the network 300a includes the information for identifying the carrier, such as an IP address provided by the carrier managing the network 300a. Similarly, the terminal information TEINF transmitted from the terminal apparatus 200 to the management apparatus 100 via the network 300b includes the information for identifying the carrier, such as an IP address provided by the carrier managing the network 300b.

When the terminal apparatus 200 is connected to the networks 300, the terminal apparatus 200 may randomly transmit the terminal information TEINF to the management apparatus 100 until a predetermined period of time elapses after the control request REQs1 and the terminal information TEINF is transmitted to the management apparatus 100. When the terminal apparatus 200 is connected to the networks 300, the network 300 that is to be used to transmit the terminal information TEINF is randomly selected from the networks 300 that are currently connected to the terminal apparatus 200. As a result, the pieces of terminal information TEINF, which are transmitted from the terminal apparatus 200 via the different networks 300 from among the networks 300 that are currently connected to the terminal apparatus 200, is expected to reach the management apparatus 100.

Figure 10:
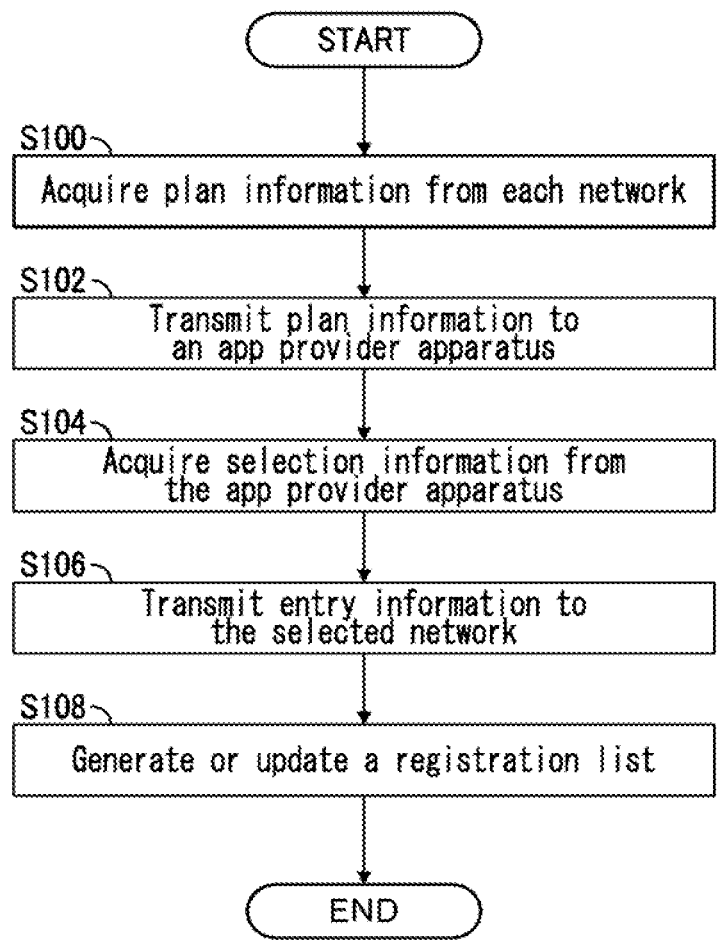
FIG. 10 is a flow chart illustrating an example of procedures of the management apparatus about an application for QoS usage.

FIG. 10 is a flow chart illustrating an example of procedures of the management apparatus 100 about the application for QoS usage. For example, the procedures illustrated in FIG. 10 are executed by the charge manager 130 of the management apparatus 100.

First, in step S100, the charge manager 130 acquires the plan information PPL, which shows the fee plans of the networks 300, from each of the networks 300. Then, in step S102, the charge manager 130 transmits the pieces of plan information PPL, which have been acquired from the networks 300, to the app provider apparatus 400.

Next, in step S104, the charge manager 130 acquires the selection information SELINF, which shows the network 300 selected as the network 300 to execute the QoS control, from the app provider apparatuses 400. In a case in which any one of the carriers provides different application programs PRap to one or more terminal apparatuses 200, the carrier may select the network 300, which is to execute the QoS control, for each application program PRap. In such a case, the app provider apparatus 400 managed by the single carrier may transmit the selection information SELINF to the management apparatus 100 for each application program PRap. Alternatively, the app provider apparatus 400 managed by the single carrier may transmit the information including pieces of selection information SELINF, which corresponds to the application programs PRap, to the management apparatus 100.

Next, in step S106, the charge manager 130 transmits the entry information ENTINF to the network 300, which has been selected as the network 300 to execute the QoS control, for example, for each application program PRap.

Next, in step S108, the charge manager 130 generates or updates the registration list LST based on the selection information SELINF acquired in step S104. When the registration list LST has not yet been generated, the charge manager 130 generates the registration list LST based on the selection information SELINF acquired in step S104. When the registration list LST has already been generated, the charge manager 130 updates the registration list LST based on the selection information SELINF acquired in step S104.

In this manner, the charge manager 130 notifies the application provider of the fee plans about usage of the QoS control and causes the application provider to select the network 300 which is to execute the QoS control from among the networks 300. Then, the charge manager 130 manages the registration list LST, in which the network 300 selected by the application provider is registered, based on the selection information SELINF.

The procedures of the management apparatus 100 related to the application for QoS usage are not limited to the example illustrated in FIG. 10. Step S106 may be executed after step S108, or it may be executed in parallel with step S108. When any of the fee plans is changed, the charge manager 130 may notify the application provider of the changed fee plan at a predetermined timing. In such a case, the application provider may update the network 300, which is to execute the QoS control for the communication of the application program PRap, based on the changed fee plan. When the network 300, which is to execute the QoS control, is updated, the charge manager 130 may acquire the selection information SELINF, which shows the network 300 updated as the network 300 to execute the QoS control, from the app provider apparatus 400. The predetermined timing may be a timing at which any fee plan among the fee plans is changed, or it may be the start timing of the QoS control, or it may be the timing of the application for QoS usage (contract timing).

Figure 11:
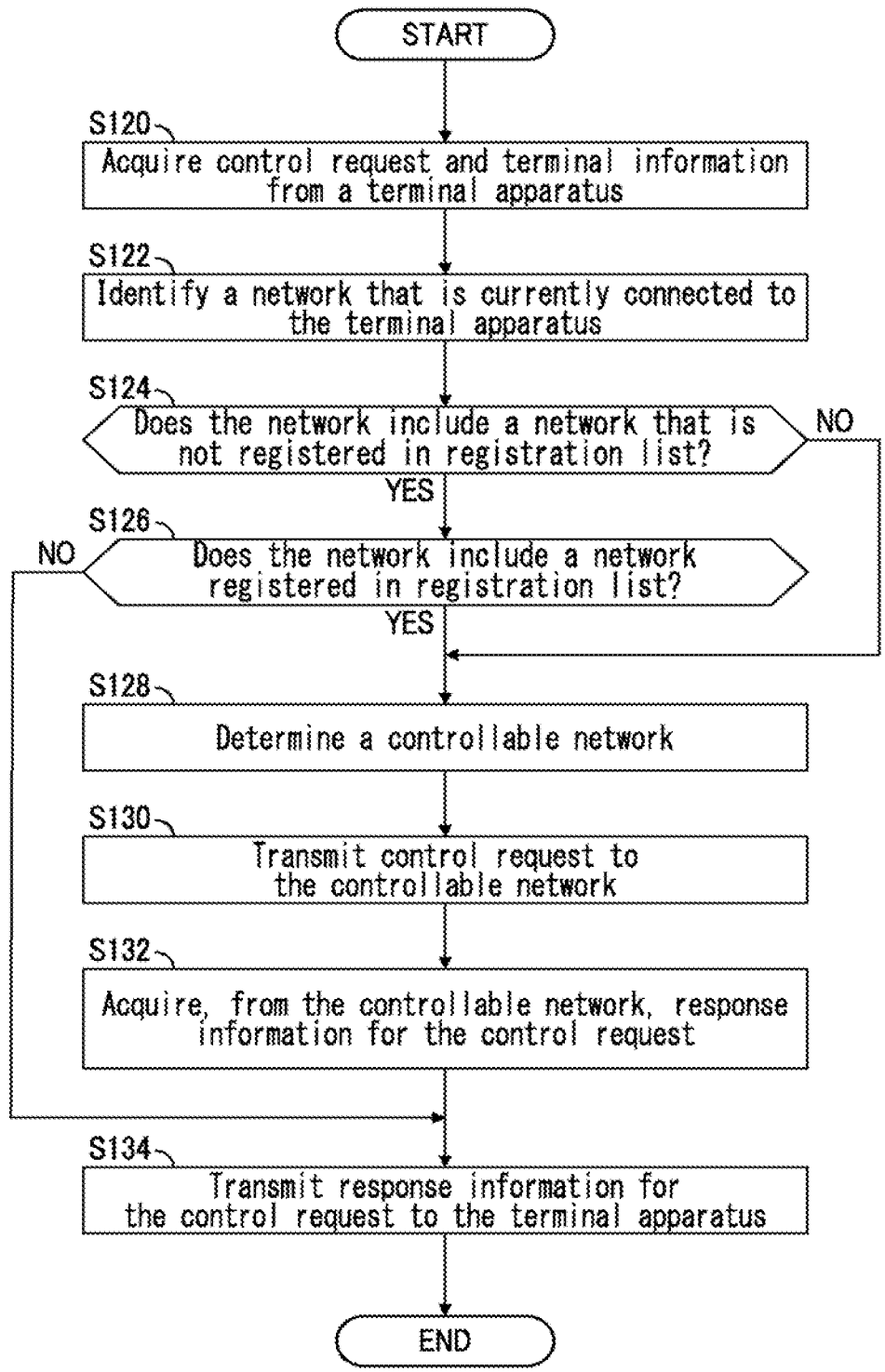
FIG. 11 is a flow chart illustrating an example of procedures of the management apparatus about QoS control.

FIG. 11 is a flow chart illustrating an example of procedures of the management apparatus 100 about the QoS control. The procedures illustrated in FIG. 11 are executed after the procedures illustrated in FIG. 10 are executed at least one time. The procedures illustrated in FIG. 11 are executed, for example, by the quality manager 120 of the management apparatus 100.

First, in step S120, the quality manager 120 acquires the control request REQs1 and the terminal information TEINF, which has been transmitted from the terminal apparatus 200 to the management apparatus 100. Then, in step S122, the quality manager 120 identifies a network 300 that is currently connected to the terminal apparatus 200 serving as the transmission source of the control request REQs1 acquired in step S120, based on the terminal information TEINF acquired in step S120.

Next, in step S124, the quality manager 120 determines whether a network 300 that is currently connected to the terminal apparatus 200 includes a network 300 that is not registered in the registration list LST. For example, the quality manager 120 determines whether the one or more networks 300 identified in step S122 includes the one or more networks 300 which are not registered in the registration list LST of the application program PRap indicated by the control request REQs1 acquired in step S120. When the result of the determination in step S124 is negative, the quality manager 120 advances the process to step S128. In contrast, when the result of the determination in step S124 is affirmative, the quality manager 120 advances the process to step S126.

Next, in step S126, the quality manager 120 determines whether the network 300 that is currently connected to the terminal apparatus 200 includes a network 300 registered in the registration list LST. For example, the quality manager 120 determines whether the network 300 identified in step S122 includes a network 300 which is registered in the registration list LST of the application program PRap indicated by the control request REQs1 acquired in step S120. When the result of the determination in step S126 is negative, the quality manager 120 advances the process to step S134. In contrast, when the result of the determination in step S126 is affirmative, the quality manager 120 advances the process to step S128.

In step S128, the quality manager 120 determines a controllable network 300. For example, the quality manager 120 determines, as a controllable network 300, a network 300 that is registered in the registration list LST of the application program PRap indicated by the control request REQs1 acquired in step S120, from among the networks 300 that are currently connected to the terminal apparatus 200.

The controllable network 300 may be selected, based on the quality mode of the QoS control, from the following (i) and (ii): (i) networks 300 that are currently connected to the terminal apparatus 200, and (ii) networks 300 that are registered in the registration list LST of the application program PRap indicated by the control request REQs1. The quality manager 120 executes step S128 and then advances to step S130.

In step S130, the quality manager 120 transmits the control request REQs2 to the controllable network 300 determined in step S128. Then, the quality manager 120 advances the process to step S132.

In step S132, the quality manager 120 acquires, from the controllable network 300, the response information for the control request REQs2, which has been transmitted to the network 300 serving as the control object in step S130. For example, when the QoS control of quality mode designated by the control request REQs2 is to be executed, the quality manager 120 acquires the positive acknowledgement ACKs as the response information for the control request REQs2. Alternatively, when the QoS control of quality mode designated by the control request REQs2 is not to be executed, the quality manager 120 acquires the negative acknowledgement NACKs as the response information for the control request REQs2. The quality manager 120 executes step S132 and then advances to step S134.

In step S134, the quality manager 120 transmits the response information for the control request REQs1 acquired in step S120, to the terminal apparatus 200. For example, in step S134 executed after step S132 is executed, the quality manager 120 transmits the response information, which has been acquired from the controllable network 300 in step S132, to the terminal apparatus 200. In step S134, which is executed when the result of the determination in step S126 is negative, the quality manager 120 transmits the negative acknowledgement NACKs to the terminal apparatus 200 as the response information for the control request REQs1.

In this manner, the quality manager 120 executes the control process for causing at least one of the networks 300 that are currently connected to the terminal apparatus 200 to execute the QoS control based on the control request REQs1, the terminal information TEINF, and the registration list LST.

The procedures of the management apparatus 100 for the QoS control are not limited to those illustrated in FIG. 11. The determination of step S126 may be executed before the determination of step S124. Alternatively, in step S124, the determination that integrates the determinations of steps S124 and S126 may be executed.

The determination of steps S124 and S126 may be omitted. In other words, the quality manager 120 may determine all the controllable networks 300 that are currently connected to the terminal apparatus 200 as controllable networks 300. Alternatively, the quality manager 120 may select the controllable network 300 from among the networks 300 that are currently connected to the terminal apparatus 200 based on the quality mode of the QoS control. When the determinations of steps S124 and S126 are omitted, the registration list LST need not be generated.

When the determinations of steps S124 and S126 are omitted, the management apparatus 100 may transmit, to the network 300, the control request REQs2, which requests the QoS control for the communication of the application program PRap for which an application for QoS usage has not been made. In such a case, the network 300 may determine, based on the entry information ENTINF, whether the control request REQs2 transmitted from the management apparatus 100 is the control request REQs2 which requests the QoS control for the communication of the application program PRap for which an application for QoS usage has been made. In other words, each network 300 may have an entry list which shows the application programs PRap which have made applications for the networks 300.

Figure 12:
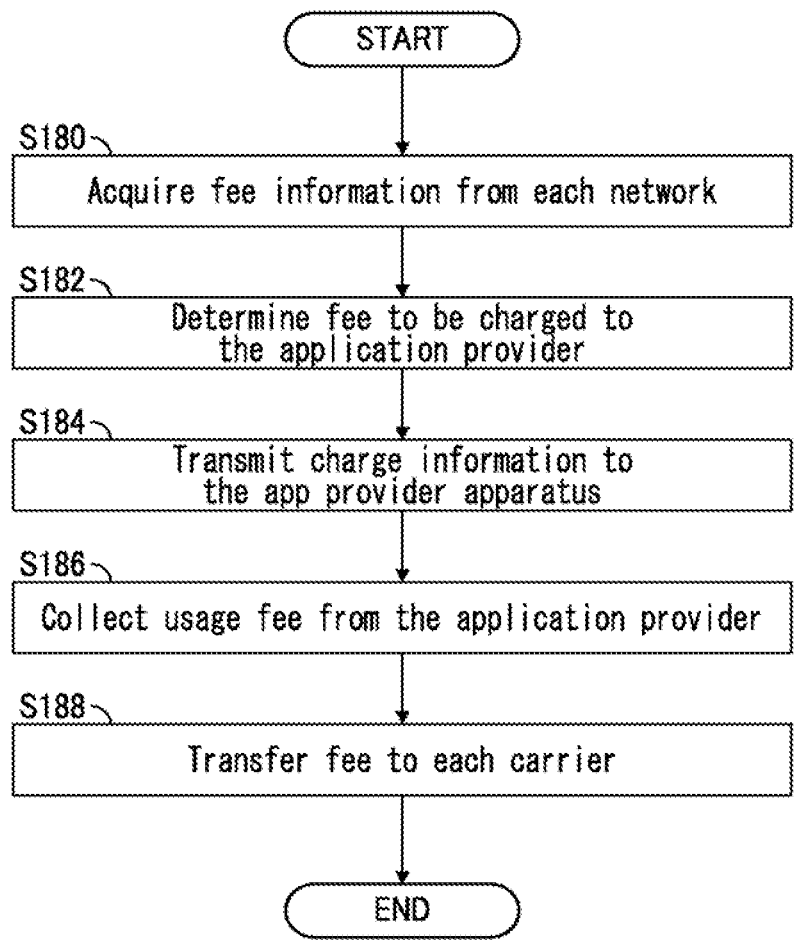
FIG. 12 is a flow chart illustrating an example of procedures of the management apparatus about charging.

FIG. 12 is a flow chart illustrating an example of procedures of the management apparatus 100 about charging. FIG. 12 shows an example of the procedures of the management apparatus 100 when charging the usage fee of the QoS control for the communication of a single application program PRap from among the application programs PRap. Therefore, in the description of FIG. 12, unless otherwise specifically stated, the application program PRap means a single application program PRap, and the application provider means the application provider which provides the single application program PRap. In the description of FIG. 12, unless otherwise specifically stated, the app provider apparatus 400 is owned by the application provider which provides the single application program PRap.

The procedures illustrated in FIG. 12 may be executed every time the QoS control for the communication of the application program PRap is ended, or they may be periodically executed. For example, the procedures illustrated in FIG. 12 is executed by the charge manager 130 of the management apparatus 100.

First, in step S180, the charge manager 130 acquires the fee information FEEINF from each network 300.

Next, in step S182, the charge manager 130 determines, based on the fee information FEEINF acquired in step S180, the fee to be charged to the application provider as the usage fee of the QoS control. For example, when the QoS control for the communication of the application program PRap is executed in the networks 300 and when a service fee of the management apparatus 100 does not exist, the total of the usage fees of the QoS control shown by the fee information FEEINF of the networks 300 corresponds to the fee. The fee may include a service fee or other fees of the management apparatus 100.

Next, in step S184, the charge manager 130 transmits the charge information CHINF, which shows the fee determined in step S182, to the app provider apparatus 400. As a result, the usage fee of the QoS control for the communication of the application program PRap is charged to the application provider, which provides the application program PRap.

Next, in step S186, the charge manager 130 collects the fee for the usage of the QoS control, from the application provider. Then, in step S188, the charge manager 130 transfers one, some, or all of the fees, which has been collected from the application provider in step S186, to each carrier based on the fee information FEEINF acquired from the respective networks 300.

The procedures of the management apparatus 100 about charging are not limited to the example illustrated in FIG. 12. The series of steps S180 and S182 may be executed at a timing different from that of step S184 through S188. Specifically, the series of steps S180 and S182 may be executed every time the QoS control is terminated. The series of step S184 to step S188 may be executed at a predetermined charge timing (e.g., day X of each month from January to December). The series of steps S180 to S182 may be executed at a predetermined interval shorter than the interval at which the series of step S184 through step S188 is executed.

When steps S180 and S182 are executed at a timing different from that of step S184, for example, the fee calculated in step S182 is the cumulative total of the fees from predetermined first timing to predetermined second timing. When the charge is determined based on the fee generated in a predetermined charge period (e.g., one month), the first timing may be a start timing of the charge period. The second timing may be a calculation timing at which the usage fee of the QoS control, which is shown by the fee information FEEINF acquired in step S180, is calculated by the network 300. When the charge period includes a plurality of calculation timings, the second timing is a calculation timing immediately before the execution timing of step S182.

The usage fee of the QoS control calculated by the network 300 may be the cumulative total of the usage fees from the first timing to the second timing, or it may be reset every time step S180 is executed. When the usage fees of the QoS control calculated by the networks 300 are reset every time step S180 is executed, the charge manager 130 calculates the cumulative total of the fees from the first timing to the second timing in step S182.

In this embodiment, the management apparatus 100 has the quality manager 120 and the charge manager 130. The quality manager 120 acquires the control request REQs1, which requests the quality control of the communication (QoS control) which is executed when the application program PRap installed in the terminal apparatus 200 is executed, and the terminal information TEINF about the terminal apparatus 200. Then, the quality manager 120 executes the control process for causing at least one of the one or more networks 300 that are currently connected to the terminal apparatus 200 to execute the QoS control based on the control request REQs1 and the terminal information TEINF. The charge manager 130 acquires the fee information FEEINF, which shows the usage fee of the QoS control, from each of the networks 300. Then, the charge manager 130 charges the application provider, which has provided the application program PRap to the terminal apparatus 200, based on the fee information FEEINF.

In this manner, in this embodiment, the management apparatus 100 executes the process about the payment of the usage fee of the QoS control regardless of the network 300 which executes the QoS control. In other words, in this embodiment, when the application provider is to carry out the procedure about the usage of QoS, such as payment of the usage fees of the QoS control for the carriers, the procedure is carried out for the management apparatus 100. As a result, in this embodiment, even when there is a possibility that the terminal apparatus 200 is connected to the networks 300, the procedures about usage of QoS by the application provider can be prevented from becoming complex.

In this embodiment, the charge manager 130 may acquire the selection information SELINF which shows the network 300 selected, as the network 300 which is to execute the QoS control from among the networks 300, by the application provider based on the fee plans. Then, the charge manager 130 may manage the registration list LST, in which the network 300 selected by the application provider is registered, based on the selection information SELINF.

Here, selecting the network 300, which is to execute the QoS control, from the networks 300 by the application provider corresponds to the application provider applying for QoS usage. In this embodiment, when the application provider is to carry out the procedure for the usage of QoS, such as an application for QoS usage for the carriers, the procedure is carried out for the management apparatus 100. As a result, in this embodiment, even when there is a possibility that the terminal apparatus 200 is connected to the networks 300, the procedures about usage of QoS by the application provider can be prevented from becoming complex.

In this embodiment, the charge manager 130 may notify the application provider of more than one fee plan about usage of the QoS control. In such a case, the charge manager 130 can cause the application provider to select the network 300, which is to execute the QoS control, based on the fee plans by notifying the application provider of the fee plans about usage of the QoS control. Furthermore, when any of the fee plans is changed, the charge manager 130 may notify the application provider of the changed fee plan at a predetermined timing. In such a case, the application provider may update the network 300, which is to execute the QoS control for the communication of the application program PRap, based on the changed fee plan. As a result, in this embodiment, even when any fee plan of the fee plans is changed, the application provider can be caused to appropriately select the network 300, which is to execute the QoS control.

In this embodiment, the quality manager 120 may execute a control process for causing at least one of the one or more networks 300 that are currently connected to the terminal apparatus 200 to execute the QoS control based on the registration list LST, the control request REQs1, and the terminal information TEINF. In such a case, the network 300 for which an application for QoS usage has not been made by the application provider from among the networks 300 that are currently connected to the terminal apparatus 200 can be prevented from being requested for the QoS control.

For example, the quality manager 120 identifies, based on the terminal information TEINF, a network 300 that is currently connected to the terminal apparatus 200 from among the networks 300. Then, when one or more of the networks 300 identified based on the terminal information TEINF includes a network 300 which is not registered in the registration list LST, the quality manager 120 executes the control process so that the network 300 that is not registered in the registration list LST does not execute the QoS control for the communication of the application program PRap. As a result, in this embodiment, execution of the QoS control can be prevented in the network 300 for which usage of the QoS has not been applied.

2. Modifications

The present invention is not limited to the embodiment exemplified above. Specific modifications will be exemplified below. Two or more modifications freely selected from following examples may be combined.

First Modification

In the foregoing embodiment, the procedures of the network 300, in which an upper fee limit to limit execution of the QoS control is defined in the fee plan, are not particularly described. However, the network 300 may execute the QoS control on condition that the usage fee of the QoS control has not reached the upper fee limit. When the usage fee of the QoS control reaches the upper fee limit of the fee plan during execution of the QoS control, the network 300 may terminate the QoS control and transmit the information which shows that the QoS control has been terminated to the terminal apparatus 200. The network 300 may transmit the information which shows that the QoS control has been terminated to the terminal apparatus 200 via the management apparatus 100.

When the usage fee of the QoS control has already reached the upper fee limit of the fee plan at the point when the control request REQs2 is received, the network 300 may transmit the negative acknowledgement NACKs to the terminal apparatus 200 as the response information for the control request REQs2. The network 300 may transmit the negative acknowledgement NACKs for the control request REQs2 to the terminal apparatus 200 via the management apparatus 100.

Figure 13:
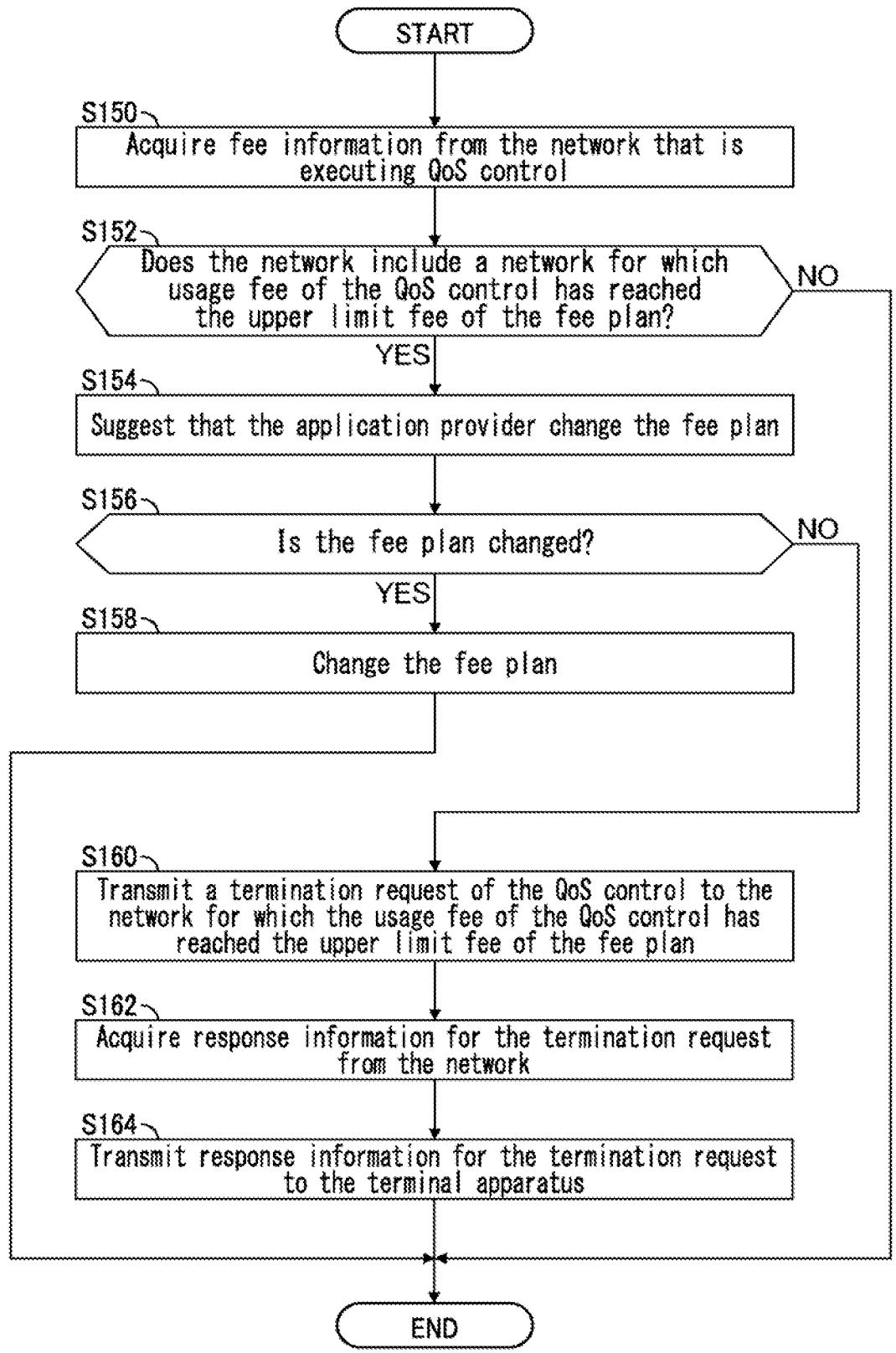
FIG. 13 is a flow chart illustrating an example of procedures of the management apparatus according to a first modification.

As illustrated in FIG. 13, the charge manager 130 may suggest the application provider to change the fee plan of the network 300 for which the usage fee has reached the upper fee limit from among the networks 300.

FIG. 13 is a flow chart illustrating an example of procedures of the management apparatus 100 according to a first modification. FIG. 13 shows an example of the procedures of the management apparatus 100 when one or more of the networks 300 are executing the QoS control for the communication of a single one from among the application programs PRap. In the description of FIG. 13, unless otherwise specifically stated, QoS control means the QoS control for the communication of the single application program PRap. In the description of FIG. 13, unless otherwise specifically stated, the application program PRap means the single application program PRap, and the application provider means one that provides the single application program PRap.

In the procedures illustrated in FIG. 13, for example, the processes from step S150 to step S158 are executed by the charge manager 130 of the management apparatus 100. The processes from step S160 to step S164 are executed by the quality manager 120 of the management apparatus 100. In FIG. 13, a case is given in which the fee plan to be applied to the single network 300 is selectable from two or more fee plans.

First, in step S150, the charge manager 130 acquires the fee information FEEINF from the network 300, which is executing the QoS control.

Next, in step S152, the charge manager 130 determines whether the network 300, which is executing the QoS control, includes the network 300 for which the usage fee of the QoS control has reached the upper fee limit of the fee plan. For example, the charge manager 130 determines, regarding the network 300 executing the QoS control, whether the usage fee shown by the fee information FEEINF acquired in step S150 has reached the upper fee limit of the fee plan. When the result of the determination in step S152 is negative, the procedures illustrated in FIG. 13 are ended. In contrast, when the result of the determination in step S152 is affirmative, the charge manager 130 advances the process to step S154.

In step S154, the charge manager 130 suggests that the application provider change the fee plan applied to the network 300 for which the usage fee of the QoS control has reached the upper fee limit of the fee plan. For example, the charge manager 130 notifies the application provider of suggestion information suggesting to change the fee plan applied to the network 300 for which the usage fee of the QoS control has reached the upper fee limit of the fee plan. More specifically, the charge manager 130 transmits, to the app provider apparatus 400 of the application provider, the suggestion information suggesting to change the fee plan applied to the network 300 for which the usage fee of the QoS control has reached the upper fee limit of the fee plan. The charge manager 130 executes step S154 and then advances the process to step S156.

In step S156, the charge manager 130 determines whether the fee plan, which is applied to the network 300 for which the usage fee of the QoS control has reached the upper fee limit of the fee plan, is to be changed. For example, when change request information, which shows that the fee plan is to be changed, is received from the app provider apparatus 400 as the response information of the suggestion information, the charge manager 130 determines that the fee plan is to be changed. The change request information may include information showing a fee plan after the change. Alternatively, when a request to maintain information, which shows that the fee plan is not to be changed, is received from the app provider apparatus 400 as the response information of the suggestion information, the charge manager 130 determines that the fee plan is not to be changed. When the change request information has not been received until a predetermined time elapses after the suggestion information is transmitted, the charge manager 130 may determine not to change the fee plan.

When the result of the determination in step S156 is negative, the charge manager 130 advances the process to step S160. In contrast, when the result of the determination in step S156 is affirmative, the charge manager 130 advances the process to step S158.

In step S158, the charge manager 130 changes the fee plan, which is applied to the network 300 for which the usage fee of the QoS control has reached the upper fee limit of the fee plan, based on the reply (e.g., the change request information) from the app provider apparatus 400. For example, the charge manager 130 transmits plan change information, which shows the fee plan after the change, to the network 300 for which the fee plan is to be changed.

When step S158 is ended, the procedures illustrated in FIG. 13 are ended. When the fee plan is not to be changed, step S160 is executed.

In step S160, the quality manager 120 transmits the termination request REQe of the QoS control to the network 300 for which the usage fee of the QoS control has reached the upper fee limit of the fee plan. The quality manager 120 executes step S160 and then advances the process to step S162.

In step S162, the quality manager 120 acquires the response information for the termination request REQe, from the network 300, which is the transmission destination of the termination request REQe. For example, when the network 300, which has received the termination request REQe, is to terminate the QoS control, the quality manager 120 acquires the positive acknowledgement ACKe as the response information for the termination request REQe.

Alternatively, when the network 300, which has received the termination request REQe, is not to terminate the QoS control, the quality manager 120 may acquire the information (e.g., negative acknowledgement) showing that the QoS control is not to be terminated as the response information for the termination request REQe. The quality manager 120 executes step S162 and then advances the process to step S164.

In step S164, the quality manager 120 transmits the response information (the response information acquired in step S162) for the termination request REQe, to the terminal apparatus 200. When the network 300, which has received the termination request REQe, is not to terminate the QoS control, the quality manager 120 is not required to transmit the response information, which has been acquired in step S162, to the terminal apparatus 200. When step S164 is ended, the procedures illustrated in FIG. 13 are ended.

In the procedures illustrated in FIG. 13, the charge manager 130 suggests that the application provider change the fee plan of the network 300 for which the usage fee of the QoS control has reached the upper fee limit. In such a case, the fee plan corresponding to the usage volume of the QoS control can be appropriately selected by the application provider.

In the procedures illustrated in FIG. 13, when the fee plan is not to be changed, the charge manager 130 transmits the termination request REQe of the QoS control to the network 300 for which the usage fee of the QoS control has reached the upper fee limit. In such a case, in the network 300 for which the usage fee of the QoS control has reached the upper fee limit, execution of the QoS control can be prevented from being continued.

Figure 14:
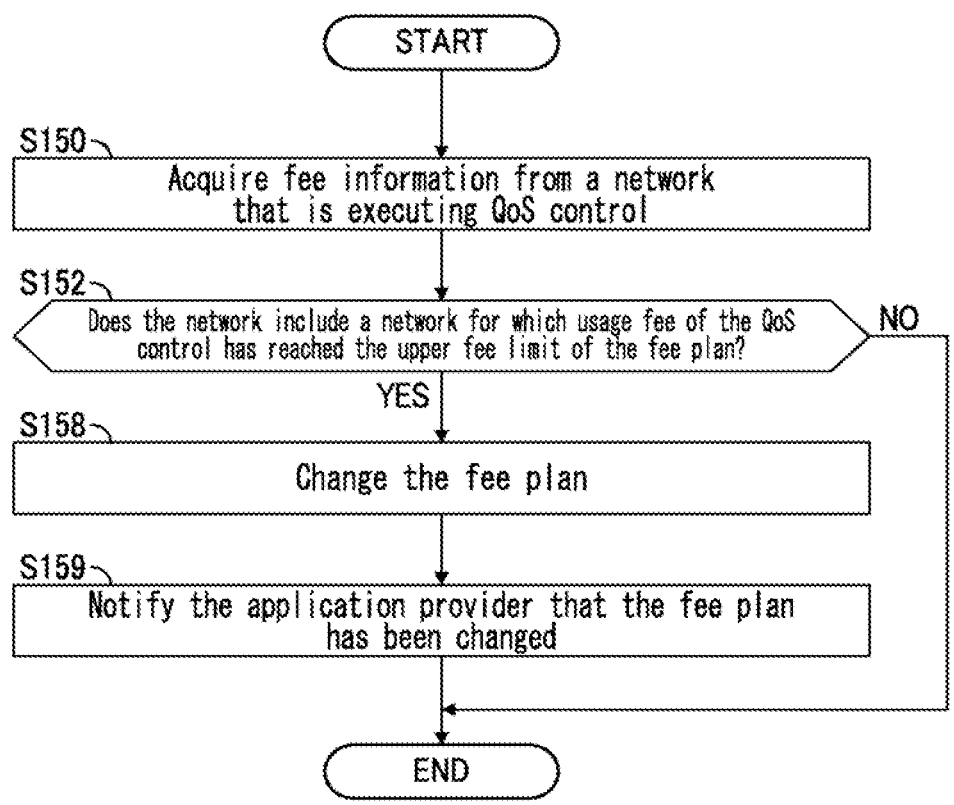
FIG. 14 is a flow chart illustrating another example of procedures of the management apparatus according to the first modification.

The procedures of the management apparatus 100 according to the first modification are not limited to those illustrated in FIG. 13. As illustrated in FIG. 14, the charge manager 130 may change the fee plan of the network 300, for which the usage fee of the QoS control has reached the upper fee limit from among the networks 300, to a fee plan having a higher upper fee limit than the current plan. Then, the charge manager 130 may notify the application provider that the fee plan has changed.

FIG. 14 is a flow chart illustrating another example of procedures of the management apparatus 100 according to the first modification. The procedures illustrated in FIG. 14 differ from those illustrated in FIG. 13 in that the management apparatus 100 changes the fee plan without suggesting that the application provider change the fee plan of the network 300 for which the usage fee of the QoS control has reached the upper fee limit. For example, in the procedures illustrated in FIG. 14, steps S154, S156, S160, S162, and S164 are deleted from those illustrated in FIG. 13. Step S159 is added to the procedures illustrated in FIG. 13. In FIG. 14, detailed description of the procedures which have been described in FIG. 13 will be omitted.

For example, in step S158, the charge manager 130 changes the fee plan of the network 300 for which the usage fee of the QoS control has reached the upper fee limit to another fee plan having a higher upper fee limit than the current fee plan. Then, in step S159, the charge manager 130 notifies the application provider that the fee plan of the network 300 for which the usage fee of the QoS control has reached the upper fee limit has been changed. The charge manager 130 transmits change information, which shows that the fee plan of the network 300 for which the usage fee of the QoS control has reached the upper fee limit has been changed, to the app provider apparatus 400 of the application provider. When step S159 is ended, the procedures illustrated in FIG. 14 are ended.

Thus, in the procedures illustrated in FIG. 14, the fee plan of the network 300 for which the usage fee of the QoS control has reached the upper fee limit can be changed to the fee plan corresponding to the usage volume of the QoS control. As a result, in the procedures illustrated in FIG. 14, the QoS control can be prevented from being terminated before the application program PRap is terminated.

Second Modification

In the first modification, the procedures of the management apparatus 100, etc., in the case in which the upper fee limit of the fee plan has been changed, are not described in particular. However, the management apparatus 100 may update the registration list LST based on the fee plan in which the upper fee limit has been changed. When any of the upper fee limits of more than one fee plan has been changed to a first fee designated by the application provider or higher, the charge manager 130 may delete, from the registration list LST, the network 300 corresponding to the fee plan in which the upper fee limit has been changed to the first fee or higher. Specifically, when the upper fee limit of the fee plan of the network 300a registered in the registration list LST of the application program PRapα has been changed to the first fee or higher, the charge manager 130 may delete the network 300a from the registration list LST of the application program PRapα.

When any of the upper fee limits of the fee plans has been changed from a fee equal to or higher than the first fee to a fee less than the first fee, the charge manager 130 may add the network 300, which is corresponding to the fee plan in which the upper fee limit has been changed to less than the first fee, to the registration list LST. The first fee may differ between two cases: a case in which the network 300 is to be deleted from the registration list LST, and a case in which the network 300 is to be added to the registration list LST. For example, the first fee in the case in which the network 300 is to be deleted from the registration list LST may be a higher than the first fee in the case in which the network 300 is to be added to the registration list LST.

In the second modification, effects which are substantially the same as those of the foregoing embodiment and the first modification can be obtained. Furthermore, in the second modification, the network 300 registered in the registration list LST as the network 300 which executes the QoS control can be automatically changed depending on the change in the upper limit value of the fee plan.

Third Modification

In the foregoing embodiment, the first and second modifications, the procedures of the management apparatus 100, etc. in the case in which an upper limit with respect to the application provider is set are not particularly described. However, the management apparatus 100 may reject the control request REQs1 of the QoS control for which the charge has reached the upper limit.

When the charge for the application provider, which provides the application program PRap indicated by the control request REQs1, has reached a second fee designated by the application provider, the quality manager 120 may reject the control request REQs1. The upper limit determination whether the charge for the application provider has reached the second fee may be executed, after step S120 illustrated in FIG. 11. When the result of the upper limit determination is negative, the quality manager 120 may advance the process to S122; and when the result of the upper limit determination is affirmative, the quality manager 120 may advance the process to step S134.

Here, when the charge is determined based on the fee generated in a predetermined charge period (e.g., one month), the charge for the application provider referenced in the upper limit determination is the cumulative total of the fees from the start timing of the charge period to the execution timing of the upper limit determination. Also, when the application provider provides a plurality of application programs PRap, the charge for the application provider may be the total of the charges of the QoS control corresponding to the application programs PRap. Alternatively, when the application provider provides application programs PRap, the charge for the application provider may be for each application program PRap for the application provider. In such a case, as the determination whether the charge for the application provider has reached the second fee, the quality manager 120 may determine whether the charge of the QoS control corresponding to the application program PRap indicated by the control request REQs1 has reached the second fee.

Figure 15:
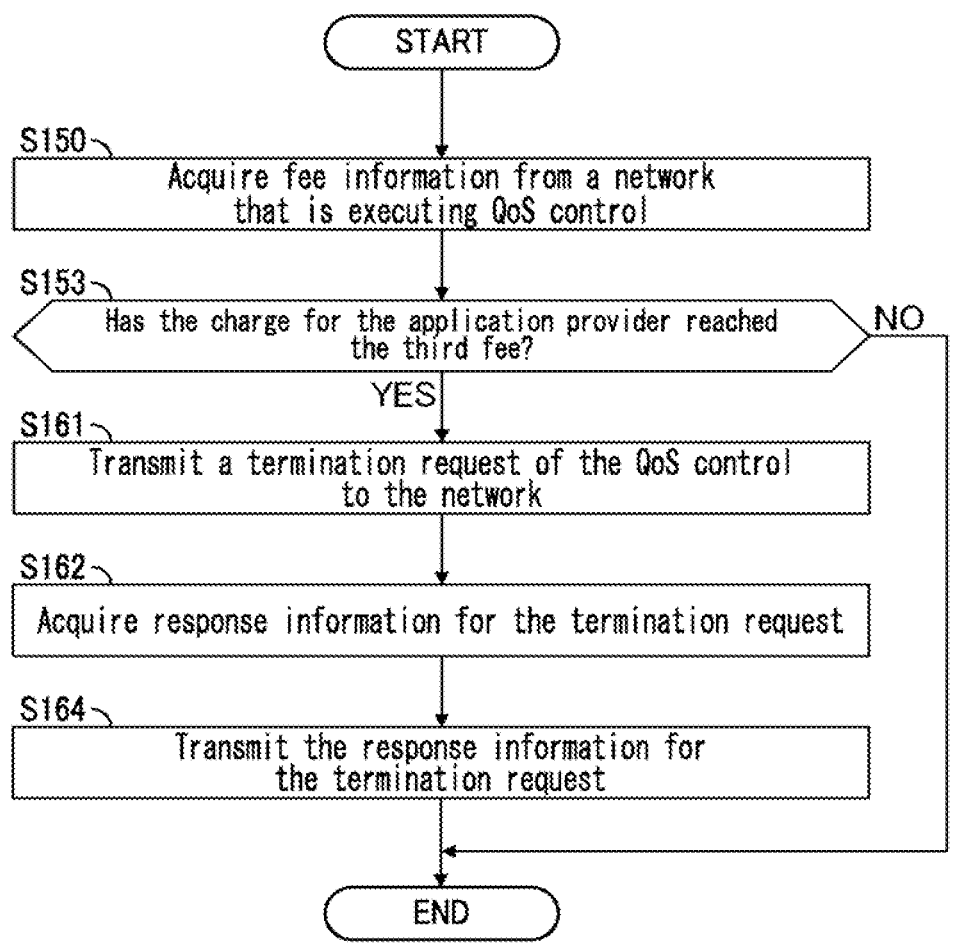
FIG. 15 is a flow chart illustrating an example of procedures of the management apparatus according to a third modification.

The procedures of the management apparatus 100 according to the third modification are not limited to such an example. For example, as illustrated in FIG. 15, when the charge for the application provider reaches a third fee, which is designated by the application provider, during execution of the QoS control, the quality manager 120 may terminate the QoS control. The third fee may be the same as the second fee, or it may differ from the second fee.

FIG. 15 is a flow chart illustrating an example of procedures of the management apparatus 100 according to the third modification. FIG. 15 shows an example of the procedures of the management apparatus 100 in a case in which one or a plurality of the networks 300 is executing the QoS control for the communication of a single application program PRap from among the plurality of application programs PRap. In the description of FIG. 15, unless otherwise specifically stated, the QoS control is implemented for the communication of the single application program PRap, and the application program PRap is intended to be a single. In the description of FIG. 15, unless otherwise specifically stated, the application provider means one which provides the single application program PRap.

In the procedures illustrated in FIG. 15, steps S150 and S153 are executed by the charge manager 130 of the management apparatus 100. Steps S161, S162, and S164 are executed by the quality manager 120 of the management apparatus 100. In FIG. 15, detailed description of the procedures which have been described with FIG. 1 to FIG. 14 will be omitted.

First, in step S150, the charge manager 130 acquires the fee information FEEINF from the network 300, which is executing the QoS control.

Next, in step S153, the charge manager 130 determines whether the charge for the application provider has reached the third fee based on the fee determined based on the usage fee shown by the fee information FEEINF acquired in step S150. The determination whether the charge for the application provider has reached the third fee is the same as the upper limit determination except that the third fee is referenced instead of the second fee. When the result of the determination in step S153 is negative, the procedures illustrated in FIG. 15 are terminated. In contrast, when the result of the determination in step S153 is affirmative, the charge manager 130 advances the process to step S161.

In step S161, the quality manager 120 transmits the termination request REQe of the QoS control to the network 300, which is executing the QoS control. Then, in step S162, the quality manager 120 acquires the response information for the termination request REQe, from the network 300, which is the transmission destination of the termination request REQe. Next, in step S164, the quality manager 120 transmits the response information (the response information acquired in step S162) for the termination request REQe, to the terminal apparatus 200. When step S164 is ended, the procedures illustrated in FIG. 15 are terminated.

Thus, in the third modification, a fee equal to or higher than the fee (e.g., the second or third fee) expected by the application provider can be prevented from being charged to the application provider.

Fourth Modification

In the foregoing embodiment and the first to third modifications, cases are described in which the terminal apparatus 200 transmits the control request REQs1 to the management apparatus 100. However, the present invention is not limited to such aspects. The terminal apparatus 200 may transmit the control request REQs1 to the quality control apparatuses 302 of all of the networks 300 that are currently connected to the terminal apparatus 200. In this case, the quality control apparatus 302, which has received the control request REQs1 from the terminal apparatus 200, transfers the control request REQs1 to the management apparatus 100 and stands by for execution of the QoS control until the control request REQs2 is received from the management apparatus 100 in response to the control request REQs1.

For example, the quality manager 120 of the management apparatus 100 identifies, as a network 300 that is currently connected to the terminal apparatus 200, the network 300 including the quality control apparatus 302 that has transferred the control request REQs1 to the management apparatus 100. Then, the quality manager 120 of the management apparatus 100 selects controllable network 300 from among the networks 300 that are currently connected to the terminal apparatus 200 and transmits the control request REQs2 to the quality control apparatus 302 of the controllable network 300, in response to the control request REQs1. The quality manager 120 may transmit, to the quality control apparatus 302 of the non-controlled network 300, information (e.g., negative acknowledgement NACKs) that prevents the quality control apparatus 302 of this network 300 from executing the QoS control depending on the control request REQs1.

In the fourth modification, effects which are substantially the same as those of the embodiment and the first to third modifications can be obtained. However, since the transmission destination of the control request REQs1 is determined depending on the carriers in the fourth modification, the application program PRap may be complex compared with the embodiment and the first to third modifications.

Fifth Modification

The foregoing embodiment and the first to fourth modifications have shown the cases in which the control process for causing the controllable network 300 to start the QoS control includes the process of transmitting the control request REQs2 to the controllable network 300. However, the present invention is not limited to such aspects.

In the foregoing embodiment and the first to third modifications, the control process may include a process in which the management apparatus 100 transmits the carrier individual information CAINF, which is necessary for the terminal apparatus 200 to request the QoS control to the controllable network 300, to the terminal apparatus 200. In such a case, the terminal apparatus 200 transmits the control request REQs2 to the controllable network 300, based on the carrier individual information CAINF received from the management apparatus 100.

In the fourth modification, when the quality control apparatus 302 determines whether the QoS control is executable based on the control request REQs1 received from the terminal apparatus 200, the quality control apparatus 302 may transmit the determination result to the management apparatus 100 or the terminal apparatus 200. Specifically, when the QoS control corresponding to the control request REQs1 is executable, the quality control apparatus 302 may transmit the information, which shows that the QoS control is executable, to the management apparatus 100. Alternatively, when the QoS control corresponding to the control request REQs1 is not executable, the quality control apparatus 302 may transmit the negative acknowledgement NACKs to the terminal apparatus 200.

The quality manager 120 of the management apparatus 100 selects the controllable network 300 from among the networks 300 including the quality control apparatus 302 which has transmitted the information showing that the QoS control is executable. Then, the quality manager 120 may transmit the information, which cancels the standby of execution of the QoS control corresponding to the control request REQs1, to the quality control apparatus 302 of the controllable network 300. The quality manager 120 may transmit, to the quality control apparatus 302 of the non-controlled network 300, information (e.g., negative acknowledgement NACKs) that prevents execution of the QoS control depending on the control request REQs1.

In the fifth modification, effects which are substantially the same as those of the foregoing embodiment and the first to fourth modifications can be obtained.

Sixth Modification

In the foregoing embodiment and the first to fifth modifications, the cases in which the terminal apparatus 200 transmits the control request REQs1 to the management apparatus 100 have been shown. However, the present invention is not limited to these modes. For example, an application management apparatus (not shown in FIG. 1, etc.), which is a communication destination of the terminal apparatus 200 executing the application program PRap serving as the QoS control, may transmit (i) the control request REQs1 of the QoS control for the terminal apparatus 200, and (ii) the terminal information TEINF about the terminal apparatus 200 to the management apparatus 100. In other words, the quality manager 120 of the management apparatus 100 may acquire, from the application management apparatus, the control request REQs1 of the QoS control for the terminal apparatus 200, and the terminal information TEINF about the terminal apparatus 200. The function of the application management apparatus may be included in the app provider apparatus 400.

In the sixth modification, the effects which are substantially the same as those of the foregoing embodiment and the first to fifth modifications can be obtained.

3. Other Matters (1) In the foregoing embodiments, the memory 160 is a recording medium readable by the processor 110, such as ROM and RAM. However, the memory 160 may be flexible disks, magneto-optical disks (e.g., compact disks, digital multi-purpose disks, Blu-ray (registered trademark) discs, smart cards, flash memory devices (e.g., cards, sticks, key drives), Compact Disc-ROMs (CD-ROMs), registers, removable discs, hard disks, floppy (registered trademark) disks, magnetic strips, databases, servers, or other suitable storage mediums. The program may be transmitted by a network or system via telecommunication lines.

(2) The aspects and embodiments described herein are applicable to at least one of systems utilizing long term evolution (LTE), LTE-advanced (LTE-A), SUPER 3G, IMT-Advanced, 4th generation mobile communication system (4G), 4th generation mobile communication system (5G), future radio access (FRA), new radio (NR), W-CDMA (registered trademark), GSM (registered trademark), CDMA2000, ultra mobile broadband (UMB), IEEE 802.11 (Wi-Fi), IEEE 802.16 (WiMax (registered trademark)), IEEE 802.20, Ultra-WideBand (UWB), Bluetooth (registered trademark), systems using other proper systems, and next generation systems extended based thereon, or to a combination of more than one system (e.g., a combination of at least one of LTE or LET-A and 5G).

(3) In the foregoing embodiments, information, signals and the like may be presented by use of various techniques. For example, data, instructions, commands, information, signals, bits, symbols, chips, and the like may be presented by freely selected combination of voltages, currents, electromagnetic waves, magnetic fields or magnetic particles, light fields or photons.

(4) In the foregoing embodiments, input and/or output information, etc., may be stored in a specific location (e.g., memory) or may be managed by use of a management table. The information, etc., that is input and/or output may be overwritten, updated, or appended. The information, etc., that is output may be deleted. The information, etc., that is input may be transmitted to other devices.

(5) In the foregoing embodiments, determination may be made by values that can be represented by one bit (0 or 1), may be made in Boolean values (true or false), or may be made by comparing numerical values (for example, comparison with a predetermined value).

(6) The order of processes, sequences, flowcharts, etc., that have been used to describe the embodiments may be changed as long as they do not conflict. For example, although a variety of methods has been illustrated in this disclosure with a variety of elements of steps in exemplary orders, the specific orders presented herein are by no means limiting.

(6) Each of functions shown in FIG. 1 and other drawings is implemented by freely selected combination of at least one of hardware and software. The method of realizing each functional block is not limited thereto. That is, each functional block may be implemented by one piece of device that is physically and/or logically aggregated. Alternatively, each functional block may be realized by directly and/or indirectly connecting two or more physically and/or logically separate pieces of device (by using cables and/or radio, for example), and using these devices. The functional block may be realized by combining the software with one device described above or these devices.

The communication devices 170 and 270 are hardware (a transmitting and receiving device) for communicating between computers via at least one of a wired network and a wireless network. The communication device 170 is referred to as, for example, a network device, a network controller, a network card, or a communication module. The communication devices 170 and 270 may include a high-frequency switch, duplexers, filters, or frequency synthesizers to realize Frequency Division Duplexing (FDD) and/or Time Division Duplexing (TDD: Time Division (Duplexing).

(8) In the foregoing embodiments, programs, whether referred to as software, firmware, middleware, microcode, hardware description language, or by any other name, are instructions, instruction sets, code, code segments, or program code. It should be interpreted broadly to mean programs, subprograms, software modules, applications, software applications, software packages, routines, subroutines, objects, executable files, execution threads, procedures, functions, etc.

Software, instructions and so forth may be transmitted and received via communication media. For example, when software is transmitted from a website, a server, or other remote sources, by using wired technologies such as coaxial cables, optical fiber cables, twisted-pair cables, and digital subscriber lines (DSL), and/or wireless technologies such as infrared radiation, radio and microwaves, etc., these wired technologies and/or wireless technologies are also included in the definition of communication media.

(9) In the foregoing aspects, the terms "system" and "network" are used interchangeably.

(10) The information and parameters described in this disclosure may be represented by absolute values, may be represented by relative values with respect to predetermined values, or they may be represented by using other pieces of applicable information. For example, radio resources may be identified by predetermined indices. The names used for parameters in this specification are in no respect limiting. In addition, equations and/or the like to use these parameters may be other than those explicitly disclosed in this specification. For example, since a variety of channels (for example, PUCCH, PDCCH, etc.) and information elements (for example, TPC) can be identified by any suitable names, a variety of names to assign to these various channels and information elements are in no respect limiting.

(11) In the foregoing embodiments, the terminal device 200 may be a mobile station (MS). A mobile station (mobile device) may be referred to, by one skilled in the art as a "subscriber station", a "mobile unit", a "subscriber unit", a "wireless unit", a "remote unit", a "mobile device", a "wireless device", a "wireless communication device", a "remote device", a "mobile subscriber station", a "access terminal", a "mobile terminal", a "wireless terminal", a "remote terminal", a "handset", a "user agent", a "mobile client", a "client", or some other suitable terms. The terms "mobile station", "user terminal", "user equipment (UE)", "terminal", and the like may be used interchangeably in the present disclosure.

(12) In the foregoing embodiments, the terms "connected" and "coupled", or any modification of these terms, may mean all direct or indirect connections or coupling between two or more elements, and may include the presence of one or more intermediate elements between two elements that are "connected" or "coupled" to each other. The coupling or connection between the elements may be physical, logical, or a combination of these. For example, "connection" may be replaced with "access." As used in this specification, two elements may be considered "connected" or "coupled" to each other by using one or more electrical wires, cables and/or printed electrical connections, and to name a number of non-limiting and non-inclusive examples, by using electromagnetic energy, such as electromagnetic is energy having wavelengths in radio frequency regions, microwave regions and optical (both visible and invisible) regions.

(13) In the foregoing embodiments, the phrase "based on" as used in this specification does not mean "based only on", unless identified otherwise. In other words, the phrase "based on" means both "based only on" and "based at least on."

(14) The term "determining" as used in this specification may encompass a wide variety of actions. For example, the term "determining" may be used when practically "determining" that some act of calculating, computing, processing, deriving, investigating, looking up (for example, looking up a table, a database, or some other data structure), ascertaining and so forth has taken place. Furthermore, "determining" may be used when practically "determining" that some act of receiving (for example, receiving information), transmitting (for example, transmitting information), inputting, outputting, accessing (for example, accessing data in a memory) and so forth has taken place. Furthermore, "determining" may be used when practically "determining" that some act of receiving (for example, receiving information), transmitting (for example, transmitting information), inputting, outputting, accessing (for example, accessing data in a memory) and so forth has taken place. That is, "determining" may be used when practically determining to take some action. The term "determining" may be replaced with "assuming", "expecting", "considering", etc.

(15) As long as terms such as "include", "comprise" and modifications of these are used in the foregoing embodiments, these terms are intended to be inclusive, in a manner similar to the way the term "provide" is used. Furthermore, the term "or" as used in this specification or in claims is not intended to be an exclusive disjunction.

(16) In the present disclosure, when articles such as, for example, "a", "an" and "the" are added in the English translation, these articles may also indicate plural forms of words, unless the context clearly indicates otherwise.

(17) In this disclosure, the phrase "A and B are different" may mean "A and B are different from each other". The phrase "A and B are different from C, respectively" may mean that "A and B are different from C". Terms such as "separated" and "combined" may be interpreted in the same way as "different".

(18) The examples and embodiments illustrated in this specification may be used individually or in combination, which may be altered depending on the mode of implementation. A predetermined piece of information (for example, a report to the effect that something is "X") does not necessarily have to be indicated explicitly, and may be indicated in an implicit way (for example, by not reporting this predetermined piece of information, by reporting another piece of information, etc.).

Although the disclosure is described in detail, it should be obvious to one skilled in the art that the present invention is by no means limited to the embodiments described in this specification. The present disclosure can be implemented with a variety of corrections and in a variety of modifications, without departing from the spirit and scope of the present invention defined as in the recitations of the claims. Consequently, the description in this specification is provided only for the purpose of explaining examples and should by no means be construed to limit the present invention in any way.

DESCRIPTION OF REFERENCE SIGNS

10 . . . network system, 100 . . . management apparatus, 110 . . . processor, 120 . . . quality manager, 130 . . . charge manager, 160 . . . storage device, 170 . . . communication device, 200 . . . terminal apparatus, 210 . . . processor, 220 . . . requester, 260 . . . storage device, 270 . . . communication device, 280 . . . input device, 290 . . . output device, 300 . . . network, 302 . . . quality control apparatus, 400 . . . app provider apparatus, and 500 . . . Internet.

The invention claimed is:

1. A management apparatus comprising:
communication circuitry configured to communicate with a terminal apparatus connectable to a plurality of networks managed by one or more carriers, the one or more carriers having different fee plans for the plurality of networks;
processing circuitry configured to:
  based on the terminal apparatus being connected to a first network included in the plurality of networks, acquire from the terminal apparatus via the first network using the communication circuitry, (i) a control request for requesting control of quality of communication, the communication being executed at execution of an application program installed in the terminal apparatus, and (ii) terminal information related to the terminal apparatus;
  based on the acquired control request and terminal information, cause the first network to execute the control of quality of the communication; and
  acquire, using the communication circuitry, from the first network that has executed the control of quality of the communication, fee information showing a usage fee of the control of quality of the communication; and
  charge a fee based on the acquired fee information to an application provider providing the application program to the terminal apparatus.

2. The management apparatus according to claim 1,
wherein the first network is selected by the application provider based on the fee plans about usage of the control of quality of the communication and
wherein the processing circuitry is configured to:
  acquire from the application provider via the communication circuit selection information showing the first network to execute the control of quality of the communication; and
  based on the acquired selection information, manage a list in which the first network selected by the application provider is registered.

3. The management apparatus according to claim 2,
wherein the processing circuitry is configured to:
  notify the application provider of the plurality of fee plans; and
  when any fee plan of the plurality of fee plans is changed, notify the application provider of the changed fee plan at a predetermined timing.

4. The management apparatus according to claim 3,
wherein the processing circuitry is configured to cause the first network to execute the control of quality of the communication based on the list, the control request, and the terminal information.

5. The management apparatus according to claim 2,
wherein the processing circuitry is configured to cause the first network to execute the control of quality of the communication based on the list, the control request, and the terminal information.

6. The management apparatus according to claim 5,
wherein the processing circuitry is configured to:
  based on the terminal information, identify the first network that is currently connected to the terminal apparatus from among the plurality of networks; and
  when the identified first network includes a second network that is not registered in the list, cause the second network not to execute the control of quality of the communication, the communication being executed at execution of the application program.

7. The management apparatus according to claim 2,
wherein each of the plurality of networks is configured to execute the control of quality of the communication on condition that from among the plurality of fee plans, the usage fee has not reached an upper fee limit defined in a corresponding fee plan,
wherein the first network is a network for which the usage fee has reached the upper fee limit, and
wherein the processing circuitry is configured to transmit to the application provider, a notification of suggesting a change of the fee plan of the first network.

8. The management apparatus according to claim 2,
wherein each of the plurality of networks is configured to execute the control of quality of the communication on condition that from among the plurality of fee plans, the usage fee has not reached an upper fee limit defined in a corresponding fee plan,
wherein the first network is a network for which the usage fee has reached the upper fee limit, and
wherein the charge manager is configured to:
  change a fee plan of the first network to a fee plan having the higher upper fee limit than a current fee plan; and
  notify the application provider that a fee plan has been changed.

9. The management apparatus according to claim 2,
wherein each of the plurality of networks is configured to execute the control of quality of the communication on condition that the usage fee has not reached an upper fee limit defined in a corresponding fee plan from among the plurality of fee plans, and
wherein the first network is a network in which the upper fee limit is changed to a first fee that is designated by the application provider or higher, and
wherein the processing circuitry is configured to delete the first network from the list.

10. The management apparatus according to claim 1,
wherein the processing circuitry is configured to reject the control request, when the charge to the application provider has reached a second fee designated by the application provider.

11. The management apparatus according to claim 1,
wherein the processing circuitry is configured to terminate the control of quality of the communication when the charge to the application provider has reached a third fee designated by the application provider during execution of the control of quality of the communication.

* * * * *